US011113291B2

(12) United States Patent
Gotmanov et al.

(10) Patent No.: US 11,113,291 B2
(45) Date of Patent: Sep. 7, 2021

(54) METHOD OF AND SYSTEM FOR ENRICHING SEARCH QUERIES FOR RANKING SEARCH RESULTS

(71) Applicant: YANDEX EUROPE AG, Lucerne (CH)

(72) Inventors: Aleksandr Nikolaevich Gotmanov, Moscow (RU); Yevgeny Aleksandrovich Grechnikov, Moscow (RU); Aleksandr Valerievich Safronov, Serpukhov (RU)

(73) Assignee: YANDEX EUROPE AG, Lucerne (CH)

( * ) Notice: Subject to any disclaimer, the term of this patent is extended or adjusted under 35 U.S.C. 154(b) by 328 days.

(21) Appl. No.: 16/387,679

(22) Filed: Apr. 18, 2019

(65) Prior Publication Data
US 2020/0089684 A1   Mar. 19, 2020

(30) Foreign Application Priority Data

Sep. 17, 2018  (RU) ........................... RU2018132848

(51) Int. Cl.
*G06F 16/00* (2019.01)
*G06F 16/2457* (2019.01)
*G06N 20/20* (2019.01)
*G06F 16/9535* (2019.01)
*G06F 16/248* (2019.01)

(52) U.S. Cl.
CPC ...... *G06F 16/24578* (2019.01); *G06F 16/248* (2019.01); *G06F 16/9535* (2019.01); *G06N 20/20* (2019.01)

(58) Field of Classification Search
CPC ............ G06F 16/24578; G06F 16/248; G06F 16/953; G06F 16/9535; G06N 20/20; G06N 3/08; G06N 5/003
USPC .................................................. 707/600–899
See application file for complete search history.

(56) References Cited

U.S. PATENT DOCUMENTS

| 6,185,558 | B1 | 2/2001 | Bowman et al. |
| 7,877,385 | B2 | 1/2011 | Craswell et al. |
| 8,606,786 | B2 | 12/2013 | Rounthwaite et al. |
| 8,645,390 | B1 | 2/2014 | Oztekin et al. |
| 9,009,146 | B1 | 4/2015 | Lopatenko et al. |
| 9,098,571 | B2 | 8/2015 | Achuthan et al. |
| 9,183,323 | B1 | 11/2015 | Shaw et al. |
| 9,659,248 | B1 | 5/2017 | Barbosa et al. |

(Continued)

*Primary Examiner* — Michelle N Owyang
(74) *Attorney, Agent, or Firm* — BCF LLP

(57) ABSTRACT

A method and a system for ranking search results in response to a current query comprising: receiving an indication of the current query from an electronic device, generating a set of search result relevant to the current search query, retrieving a plurality of past queries, computing a respective similarity parameter between the current query and a respective one of the plurality of past queries, ranking the set of current documents to obtain a ranked set of documents, the ranking being done by a machine learning algorithm (MLA) taking into account inclusion of search terms of at least one past query of the plurality of past queries in a given one of the set of current documents so that inclusion of search terms promotes rank of the given current document, and transmitting a search engine results page (SERP) including the ranked set of documents to the electronic device.

24 Claims, 9 Drawing Sheets

(56) References Cited

U.S. PATENT DOCUMENTS

| | | |
|---|---|---|
| 9,773,256 B1* | 9/2017 | Frumkin ............. G06Q 30/0242 |
| 10,915,524 B1* | 2/2021 | Gupta ..................... G06F 16/21 |
| 2007/0061333 A1* | 3/2007 | Ramer ................ G06F 16/9535 |
| 2007/0150466 A1 | 6/2007 | Brave et al. |
| 2009/0063460 A1* | 3/2009 | Selberg ............... G06F 16/9535 |
| 2009/0234711 A1* | 9/2009 | Ramer .................. G06F 16/635 |
| | | 705/14.66 |
| 2010/0010895 A1 | 1/2010 | Gabrilovich et al. |
| 2010/0082582 A1 | 4/2010 | Gao et al. |
| 2010/0185649 A1 | 7/2010 | Zhou et al. |
| 2010/0198816 A1 | 8/2010 | Kwan |
| 2011/0238662 A1* | 9/2011 | Shuster ................. G06F 16/951 |
| | | 707/728 |
| 2011/0264651 A1* | 10/2011 | Selvaraj ............. G06F 16/9535 |
| | | 707/723 |
| 2015/0262077 A1* | 9/2015 | White .................... G06N 20/00 |
| | | 706/12 |
| 2015/0347519 A1* | 12/2015 | Hornkvist ........... G06F 16/9537 |
| | | 707/722 |
| 2017/0011289 A1 | 1/2017 | Gao et al. |
| 2018/0032897 A1 | 2/2018 | Cao et al. |
| 2018/0121550 A1* | 5/2018 | Jeon ....................... G06Q 50/01 |

\* cited by examiner

METHOD OF AND SYSTEM FOR ENRICHING SEARCH QUERIES FOR RANKING SEARCH RESULTS

CROSS-REFERENCE

The present application claims priority to Russian Patent Application No. 2018132848, entitled "Method of and System for Enriching Search Queries for Ranking Search Results," filed on Sep. 17, 2018, the entirety of which is incorporated herein by reference.

FIELD

The present technology relates to information retrieval in general, and more specifically, to a method of and a system for enriching queries for ranking search results using a machine learning algorithm.

BACKGROUND

Machine learning algorithms (MLAs) are used to address multiple needs in computer-implemented technologies. Typically, the MLAs are used for generating a prediction associated with a user interaction with a computer device. One example of an area where such prediction is required is user interaction with the content available on the Internet (as an example).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows a priori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

In the search engine example, the MLA is used for generating the ranked search results. When the user submits a search query, the search engine generates a list of relevant web resources (based on an analysis of crawled web resources, an indication of which is stored in a crawler database in a form of posting lists or the like). The search engine then executes the MLA to rank the so-generated list of search results. The MLA ranks the list of search results based on their relevancy to the search query. Such the MLA is "trained" to predict relevancy of the given search result to the search query based on a plethora of "features" associated with the given search result, as well as indications of past users' interactions with search results when submitting similar search queries in the past.

U.S. Pat. No. 7,877,385 B2 granted on Jan. 25, 2011 to Microsoft and titled "Information retrieval using query-document pair information" teaches information retrieval using query-document pair information. In an embodiment, a click record is accessed having information about queries and documents where user clicks have been observed for query-document pairs. A click graph is either formed or accessed. This has nodes connected by edges, each node representing any of a document and a query and each edge representing at least one observed click. Given at least one first node in the click graph, a similarity measure is determined between that first node and each of one or more second nodes. The second nodes are then ranked on the basis of the similarity measure results and the ranking is used to retrieve information from the click record U.S. Pat. No. 8,606,786 B2 granted on Dec. 10, 2013 to Microsoft and titled "Determining a similarity measure between queries" teaches a system including a receiver component that receives a dataset that is stored in a computer-readable medium of a computing device, wherein the dataset includes a plurality of queries issued by users to a search engine and a plurality of search results selected by the users upon issuing the plurality of queries. A distribution determiner component determines click distributions over the search results selected by the users with respect to the plurality of queries. A labeler component labels at least two queries in the plurality of queries as being substantially similar to one another based at least in part upon the click distributions over the search results selected by the users with respect to the plurality of queries.

U.S. Pat. No. 9,659,248 B1 granted on May 25, 2017 to IBM and titled "Machine learning and training a computer-implemented neural network to retrieve semantically equivalent questions using hybrid in-memory representations" teaches determining semantically equivalent text or questions using hybrid representations based on neural network learning. Weighted bag-of-words and convolutional neural networks (CNN) based distributed vector representations of questions or text may be generated to compute the semantic similarity between questions or text. Weighted bag-of-words and CNN based distributed vector representations may be jointly used to compute the semantic similarity. A pair-wise ranking loss function trains neural network. In one embodiment, the parameters of the system are trained by minimizing a pair-wise ranking loss function over a training set using stochastic gradient descent (SGD).

United States Patent Application Publication No. 2018/0032897 A1 published on Feb. 1, 2018 to IBM and titled "Event clustering and classification with document embedding" teaches an embedding representation for a document that is generated based on clustering words in the document. Representative clusters are selected and weighted sum of the embeddings of the words in the selected clusters is determined as a document embedding. Documents are labeled based on document embeddings. A machine learning algorithm is trained using the documents. The machine learning algorithm predicts a label of a given document based on the given document's document embedding.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Developer(s) of the present technology have appreciated at least one technical problem associated with the prior art approaches.

Developer(s) of the present technology have appreciated that in some situations, top ranked search results appearing in a search engine results page (SERP) in response to a query may not satisfy the user, who may not necessarily browse on other pages of the SERP and click on lower ranked search results to find the information he or she is looking for, while such search results may sometimes provide the user with a satisfactory answer (or a more satisfactory answer compared to the higher ranked results).

Developer(s) of the present technology have also appreciated that search engine operators, such as Google™, Yandex™, Bing™ and Yahoo™, among others, have access to logs that include a large amount of user interaction data with respect to past search results appearing in response to past user queries (the information that is typically stored in search logs and is accessible to the search engine MLAs).

Embodiments of the present technology have been developed based on developers' appreciation that search results provided in response to a given query by a ranking MLA could be ranked by taking into account additional ranking factors, such as past queries similar to the given query, as well as respective similarity parameters indicative of a respective degree of similarity between the similar past queries and the given query. Such a similarity parameter could be determined, in different embodiments, based on user interaction data with similar search results provided in response to the given query and the similar queries, and based on a textual similarity between the similar queries and the given query.

More specifically, the present technology allows (i) determining past queries similar to a submitted query, which may have been previously submitted on the search engine, and enriching the ranking MLA of the search engine by using the similar past queries for ranking search results in response to the submitted query; and (ii) determining, by an MLA, queries similar to a newly submitted query, which may not have been previously submitted on the search engine, and enriching the ranking MLA of the search engine with the similar queries for ranking search results in response to the newly submitted query.

Thus, the present technology is directed to methods and systems for enriching search queries for ranking search results.

Such an approach may provide the user with more satisfactory answers, which minimizes a need for a user to browse several SERPs or resubmitting queries for finding the information he or she is looking for, which in turn may save computational resources on both the client device associated with the user, and the search engine server.

In accordance with a first broad aspect of the present technology, there is provided a method for ranking search results in response to a current query using a first machine learning algorithm (MLA), the method executable by a server, the server being connected to a database, the server being connected to an electronic device via a communication network, the method comprising: receiving, by the server from the electronic device, an indication of the current query, generating, by the server, a set of search results, the set of search results containing a set of current documents relevant to the current query, retrieving, by the server from the database, a plurality of past queries, each given past query of the plurality of past queries being associated with a respective set of past documents, the respective set of past documents having been presented as search results in response to the given past query of at least some others of the plurality of past queries, computing, by the server, a respective similarity parameter between the current query and a respective one of the plurality of past queries, the respective similarity parameter being indicative of a degree of similarity between the current query and the respective one of the plurality of past queries, the computing for a given one of the plurality of past queries being based on: current documents in the set of current documents, and past documents in the respective set of past documents associated with the given one of the plurality of queries, selecting a subset of the plurality of the past queries based on the respective similarity parameter being above a predetermined similarity threshold, ranking the set of current documents to obtain a ranked set of documents, the ranking being done by the first MLA, the first MLA taking into account the subset of the plurality of past queries as a ranking feature, and transmitting, by the server, a search engine results page (SERP) for display on the electronic device, the SERP including the ranked set of documents.

In some embodiments, a given current document of the set of current documents is associated with past user interactions of some of a plurality of past users with the given document presented in response to a past query that is similar to the current query, each past document of the respective set of past documents is associated with past user interactions with the respective past document presented in response to the given past query, and the computing the respective similarity parameter is further based on: past user interactions with current documents in the set of current documents, and past user interactions with past documents in the respective set of past documents associated with the given one of the plurality of queries.

In some embodiments, the method further comprises, prior to the retrieving the plurality of past queries: generating, by the server, a current query vector associated with the current query based on: the current documents of the set of current documents and the past user interactions associated with the current documents, and wherein the method further comprises, prior to the computing the respective similarity parameter between the current query and the respective one of the plurality of past queries: generating, by the server, a respective query vector associated with the respective one of the plurality of past queries based on: the past documents of the respective set of past documents and the past user interactions with the past documents, and wherein the computing the respective similarity parameter is based on the current query vector and the respective query vector.

In some embodiments, the ranking the set of current documents to obtain the ranked set of documents further comprises: taking into account, by the first MLA, the respective similarity parameter between the at least one past query and the current query as a weight of the ranking feature.

In some embodiments, the respective similarity parameter is computed by using one of: a scalar multiplication, and a cosine similarity of the current query vector and the respective query vector.

In accordance with another broad aspect of the present technology, there is provided a computer-implemented method for ranking search results in response to a current query using a first machine learning algorithm (MLA), the method being executed by a server hosting a second MLA, the server being connected to a database, the server being connected to an electronic device via a communication network, the second MLA having been trained to determine query similarity based on textual content thereof, the method comprising: receiving, by the server from the electronic device, an indication of the current query, the current query not having been previously submitted to the server, generating, by the server, a set of search results, the set of search results containing a set of current documents relevant to the current search query, retrieving, by the second MLA from the database, a plurality of past queries, each past query of the plurality of past queries having been previously submitted to the server, computing, by the second MLA, a respective similarity parameter between the current query and a respective one of the plurality of past queries, the respective similarity parameter being indicative of a degree of similarity between the current query and the respective one of the plurality of past queries, the computing for a given one of the plurality of past queries being based on: at least one textual feature of the new query, and at least one textual feature of the given one of the plurality of past queries, selecting a subset of the plurality of the past queries based on the respective similarity parameter being above a pre-determined similarity threshold, ranking the set of current documents to obtain a ranked set of documents, the ranking being done by the first MLA, the first MLA taking into account the subset of the plurality of past queries as a ranking feature, and transmitting, by the server, a search engine results page (SERP) for display on the electronic device, the SERP including the ranked set of documents.

In some embodiments, the method further comprises, prior to the retrieving the plurality of past queries: generating, by the server, a current query vector associated with the current query based on the at least one textual feature of the current query, and the method further comprises, prior to the computing the respective similarity parameter: acquiring, by the second MLA from the database, a respective query vector associated with the given one of the plurality of past queries, the respective query vector having been generated based on at least one respective textual feature of the given one of the plurality of past queries, and the computing the respective similarity parameter is based on the current query vector and the respective query vector.

In some embodiments, the retrieving the plurality of past queries is based on the current query vector.

In some embodiments, further comprising, during a training phase: acquiring, by the server from a second database connected to the server, a set of training objects, the set of training objects having been previously generated by the server, a given training object of the set of training objects including: a first past query and a second past query, the first past query and the second past query having been selected based a respective similarity parameter between the first past query and the second past query, the respective similarity parameter having been calculated based on: past documents presented in response to the first past query, and past documents presented in response to the second past query, generating a first query vector of the first query based on at least one textual feature of the first query, generating a second query vector of the second query based on at least one textual feature of the second query, training the second MLA on the set of training objects to determine: a similarity parameter between a query vector of a new query and the respective query vector of the given past query of the plurality of past queries, the new query not having been previously submitted to the server.

In some embodiments, the respective similarity parameter has been calculated further based on: past user interactions with past documents presented in response to the first past query, and past user interactions with past documents presented in response to the second past query.

In some embodiments, the similarity parameter being above a predetermined threshold is used as a positive label for the training.

In some embodiments, the ranking the set of current documents to obtain the ranked set of documents further comprises: taking into account, by the first MLA, the respective similarity parameter between the at least one past query and the current query as a weight of the ranking feature.

In some embodiments, the training the second MLA comprises using a K-Nearest Neighbor Search (K-NNS) type algorithm, and the method further comprises, after the training the second MLA: generating, by the server in the database, for each past query for the plurality of past queries: the respective query vector associated with the given past query, and an indication of the given past query, and storing the respective query vector in the database.

In some embodiments, the K-NSS type algorithm is a Hierarchical Navigable Small World (HNSW) algorithm.

In accordance with another broad aspect of the present technology, there is provided a computer-implemented method for ranking search results in response to a current query using a first machine learning algorithm (MLA), the method executable by a server, the server being connected to a database, the server being connected to an electronic device via a communication network, the method comprising: receiving, by the server from the electronic device, an indication of the current query, generating, by the server, a set of search results, the set of search results containing a set of current documents relevant to the current search query, determining, by the server, a presence of past user interactions with current documents in the set of current documents, the past user interactions with the current documents having been performed in response to a past query similar to the current query, retrieving, by the server from the database, a set of a plurality of past queries, each given past query of the plurality of past queries being associated with a respective set of past documents, the respective set of past documents having been presented as search results in response to the given past query of at least some others of the plurality of past queries, each past document of the respective set of past documents being associated with past user interactions with the respective past document presented in response to the given past query, the retrieving being executed: in response to the determining resulting in a positive outcome: generating, by the server, a current query vector associated with the current query based on: current documents in the set of current documents and the past user interactions associated with the current documents in the set of current documents, generating, by the server, a respective query vector associated with a each of the plurality of past queries, the generating being based on: the past documents and the past user interactions with the past documents in the respective set of past documents, selecting the plurality of past queries based on the similarity of the current vector sand the respective query vector, in response to the determining resulting in a negative outcome: generating, by the server, the current query vector associated with the current query based on at least one textual feature of the current query, generating, by the server, a respective query vector associated with each given past query of the plurality of past queries, the generating being based on: at least one textual feature of the given past query, selecting the plurality of past queries based on the similarity of the current query vector sand the respective query vector, ranking the set of current documents to obtain a ranked set of documents, the ranking being done by the first MLA, the first MLA taking into account at least one past query of the set of the plurality of past queries, and transmitting, by the server, a search engine results page (SERP) for display on the electronic device, the SERP including the ranked set of documents.

In accordance with another broad aspect of the present technology, there is provided a computer-implemented method for ranking search results in response to a current query using a first machine learning algorithm (MLA), the method executable by a server, the server being connected to a database, the server being connected to an electronic device via a communication network, the method comprising: receiving, by the server from the electronic device, an indication of the current query, generating, by the server, a set of search results, the set of search results containing a set of current documents relevant to the current search query, retrieving, by the server from the database, based on the indication of the current query, a plurality of past queries, computing, by the server, a respective similarity parameter between the current query and a respective one of the plurality of past queries, the respective similarity parameter being indicative of a degree of similarity between the current query and the respective one of the plurality of past queries, ranking the set of current documents to obtain a ranked set of documents, the ranking being done by the first MLA, the first MLA taking into account inclusion of search terms of at least one past query of the plurality of past queries in a given one of the set of current documents so that inclusion of search terms promotes rank of the given current document, and transmitting, by the server, a search engine results page (SERP) for display on the electronic device, the SERP including the ranked set of documents.

In accordance with another broad aspect of the present technology, there is provided a system for ranking search results in response to a current query using a first machine learning algorithm (MLA), the system being connected to a database, the system being connected to an electronic device via a communication network, the system comprising: a processor, a non-transitory computer-readable medium comprising instructions, the processor, upon executing the instructions, being configured to: receive from the electronic device, an indication of the current query, generate a set of search results, the set of search results containing a set of current documents relevant to the current query, retrieve, from the database, a plurality of past queries, each given past query of the plurality of past queries being associated with a respective set of past documents, the respective set of past documents having been presented as search results in response to the given past query of at least some others of the plurality of past queries, compute a respective similarity parameter between the current query and a respective one of the plurality of past queries, the respective similarity parameter being indicative of a degree of similarity between the current query and the respective one of the plurality of past queries, the computing for a given one of the plurality of past queries being based on: current documents in the set of current documents, and past documents in the respective set of past documents associated with the given one of the plurality of queries, select a subset of the plurality of the past queries based on the respective similarity parameter being above a predetermined similarity threshold, rank the set of current documents to obtain a ranked set of documents, the ranking being done by the first MLA, the first MLA taking into account the subset of the plurality of past queries as a ranking feature, and transmit a search engine results page (SERP) for display on the electronic device, the SERP including the ranked set of documents.

In some embodiments, a given current document of the set of current documents is associated with past user interactions of some of a plurality of past users with the given document presented in response to a past query that is similar to the current query, each past document of the respective set of past documents is associated with past user interactions with the respective past document presented in response to the given past query, andthe computing the respective similarity parameter is further based on: past user interactions with current documents in the set of current documents, andpast user interactions with past documents in the respective set of past documents associated with the given one of the plurality of queries.

In some embodiments, the processor is further configured to, prior to the retrieving the plurality of past queries: generate a current query vector associated with the current query based on: the current documents of the set of current documents and the past user interactions associated with the current documents, and wherein the processor is further configured to, prior to the computing the respective similarity parameter between the current query and the respective one of the plurality of past queries: generate a respective query vector associated with the respective one of the plurality of past queries based on: the past documents of the respective set of past documents and the past user interactions with the past documents, and wherein the computing the respective similarity parameter is based on the current query vector and the respective query vector.

In some embodiments, to rank the set of current documents to obtain the ranked set of documents, the processor is further configured to: take into account, by the first MLA, the respective similarity parameter between the at least one past query and the current query as a weight of the ranking feature.

In some embodiments, the respective similarity parameter is computed by using one of: a scalar multiplication, and a cosine similarity of the current query vector and the respective query vector.

In accordance with another broad aspect of the present technology, there is provided a system for ranking search results in response to a current query using a first machine learning algorithm (MLA), the system hosting a second MLA, the system being connected to a database, the system being connected to an electronic device via a communication network, the second MLA having been trained to determine query similarity based on textual content thereof, the system comprising: a processor, a non-transitory computer-readable medium comprising instructions, the processor, upon executing the instructions, being configured to: receive from the electronic device, an indication of the current query, the current query not having been previously submitted to the system, generate a set of search results, the set of search results containing a set of current documents relevant to the current search query, retrieve by the second MLA from the database, a plurality of past queries, each past query of the plurality of past queries having been previously submitted to the system, compute, by the second MLA, a respective similarity parameter between the current query and a respective one of the plurality of past queries, the respective similarity parameter being indicative of a degree of similarity between the current query and the respective one of the plurality of past queries, the computing for a given one of the plurality of past queries being based on: at least one textual feature of the new query, and at least one textual feature of the given one of the plurality of past queries, select a subset of the plurality of the past queries based on the respective similarity parameter being above a pre-determined similarity threshold, rank the set of current documents to obtain a ranked set of documents, the ranking being done by the first MLA, the first MLA taking into account the subset of the plurality of past queries as a ranking feature, and transmit a search engine results page (SERP) for display on the electronic device, the SERP including the ranked set of documents.

In some embodiments, the processor is further configured to, prior to the retrieving the plurality of past queries: generate a current query vector associated with the current query based on the at least one textual feature of the current query, wherein the processor is further configured to, prior to the computing the respective similarity parameter: acquire by the second MLA from the database, a respective query vector associated with the given one of the plurality of past queries, the respective query vector having been generated based on at least one respective textual feature of the given one of the plurality of past queries, and the computing the respective similarity parameter is based on the current query vector and the respective query vector.

In some embodiments, the retrieving the plurality of past queries is based on the current query vector.

In some embodiments, the processor is further configured to, during a training phase: acquire, from a second database connected to the system, a set of training objects, the set of training objects having been previously generated by the system, a given training object of the set of training objects including: a first past query and a second past query, the first past query and the second past query having been selected based a respective similarity parameter between the first past query and the second past query, the respective similarity parameter having been calculated based on: past documents presented in response to the first past query, and past documents presented in response to the second past query, generate a first query vector of the first query based on at least one textual feature of the first query, generate a second query vector of the second query based on at least one textual feature of the second query, train the second MLA on the set of training objects to determine: a similarity parameter between a query vector of a new query and the respective query vector of the given past query of the plurality of past queries, the new query not having been previously submitted to the system.

In some embodiments, the respective similarity parameter has been calculated further based on: past user interactions with past documents presented in response to the first past query, and past user interactions with past documents presented in response to the second past query.

In some embodiments, the similarity parameter being above a predetermined threshold is used as a positive label for the training.

In some embodiments, to rank the set of current documents to obtain the ranked set of documents, the processor is configured to: take into account, by the first MLA, the respective similarity parameter between the at least one past query and the current query as a weight of the ranking feature.

In some embodiments: the training the second MLA comprises using a K-Nearest Neighbor Search (K-NNS) type algorithm, and the processor is further configured to, after the training the second MLA: generate, in the database, for each past query for the plurality of past queries: the respective query vector associated with the given past query, and an indication of the given past query, and store the respective query vector in the database.

In some embodiments, the K-NSS type algorithm is a Hierarchical Navigable Small World (HNSW) algorithm.

In accordance with another broad aspect of the present technology, there is provided a system for ranking search results in response to a current query using a first machine learning algorithm (MLA), the system being connected to a database, the system being connected to an electronic device via a communication network, the system comprising: a processor, a non-transitory computer-readable medium comprising instructions, the processor, upon executing the instructions, being configured to: receive, from the electronic device, an indication of the current query, generate a set of search results, the set of search results containing a set of current documents relevant to the current search query, determine a presence of past user interactions with current documents in the set of current documents, the past user interactions with the current documents having been performed in response to a past query similar to the current query, retrieve, from the database, a set of a plurality of past queries, each given past query of the plurality of past queries being associated with a respective set of past documents, the respective set of past documents having been presented as search results in response to the given past query of at least some others of the plurality of past queries, each past document of the respective set of past documents being associated with past user interactions with the respective past document presented in response to the given past query, the retrieving being executed: in response to the determining resulting in a positive outcome: generate a current query vector associated with the current query based on: current documents in the set of current documents and the past user interactions associated with the current documents in the set of current documents, generate a respective query vector associated with a each of the plurality of past queries, the generating being based on: the past documents and the past user interactions with the past documents in the respective set of past documents, select the plurality of past queries based on the similarity of the current vector sand the respective query vector, in response to the determining resulting in a negative outcome: generate the current query vector associated with the current query based on at least one textual feature of the current query, generate a respective query vector associated with each given past query of the plurality of past queries, the generating being based on: at least one textual feature of the given past query, select the plurality of past queries based on the similarity of the current query vector sand the respective query vector, rank the set of current documents to obtain a ranked set of documents, the ranking being done by the first MLA, the first MLA taking into account at least one past query of the set of the plurality of past queries, and transmit a search engine results page (SERP) for display on the electronic device, the SERP including the ranked set of documents.

In accordance with another broad aspect of the present technology, there is provided a system for ranking search results in response to a current query using a first machine learning algorithm (MLA), the system being connected to a database, the system being connected to an electronic device via a communication network, the system comprising: a processor, a non-transitory computer-readable medium comprising instructions, the processor, upon executing the instructions, being configured to: receive, from the electronic device, an indication of the current query, generate a set of search results, the set of search results containing a set of current documents relevant to the current search query, retrieve, from the database, based on the indication of the current query, a plurality of past queries, compute a respective similarity parameter between the current query and a respective one of the plurality of past queries, the respective similarity parameter being indicative of a degree of similarity between the current query and the respective one of the plurality of past queries, rank the set of current documents to obtain a ranked set of documents, the ranking being done by the first MLA, the first MLA taking into account inclusion of search terms of at least one past query of the plurality of past queries in a given one of the set of current documents so that inclusion of search terms promotes rank of the given current document, and transmit a search engine results page (SERP) for display on the electronic device, the SERP including the ranked set of documents.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
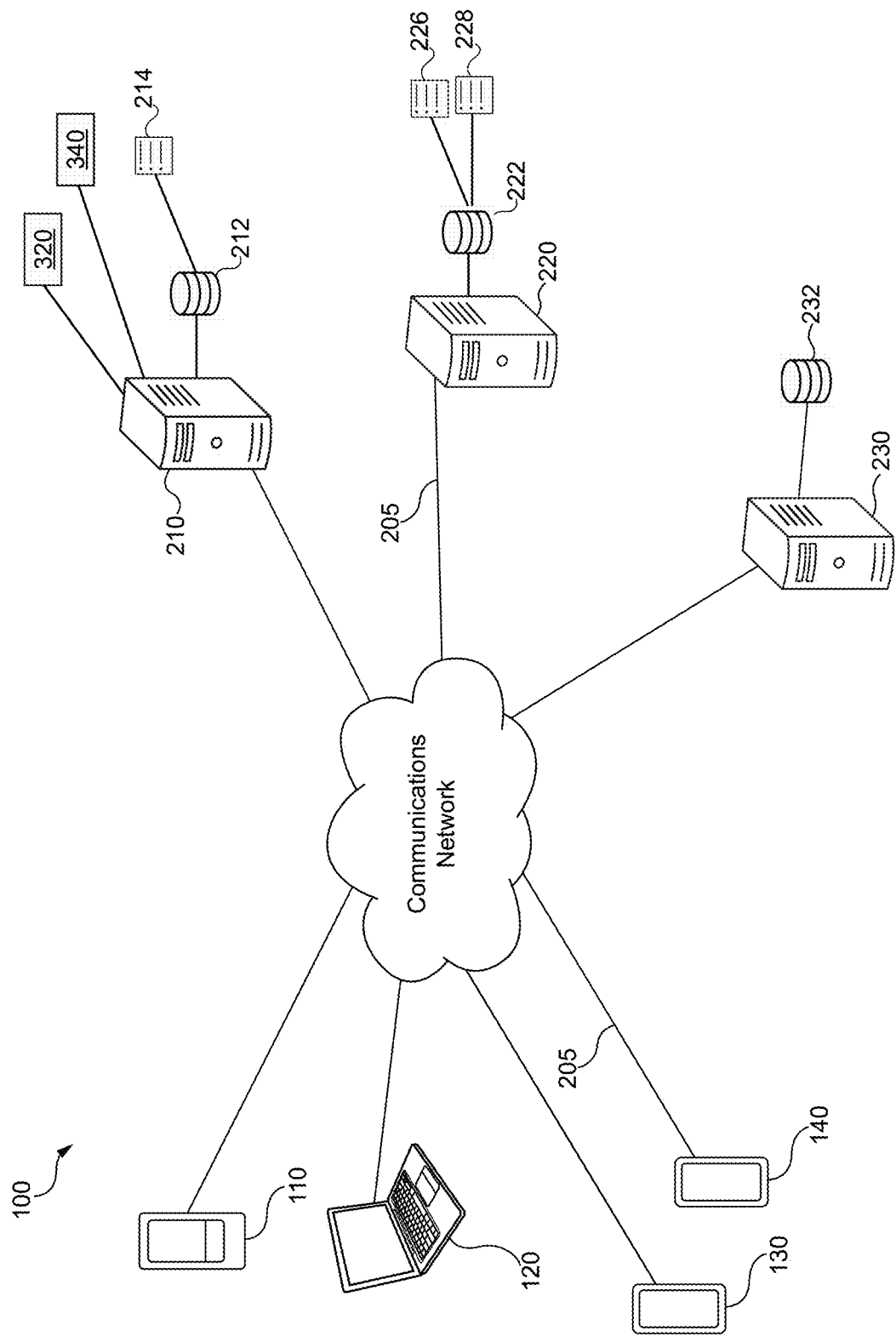
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is depicted a system 100, the system 100 implemented according to non-limiting embodiments of the present technology. The system 100 comprises a first client device 110, a second client device 120, a third client device 130, and a fourth client device 140 coupled to a communications network 200 via a respective communication link 205 (only one numbered in FIG. 1). The system 100 comprises a search engine server 210, an tracking server 220 and a training server 230 coupled to the communications network 200 via their respective communication link 205.

As an example only, the first client device 110 may be implemented as a smartphone, the second client device 120 may be implemented as a laptop, the third client device 130 may be implemented as a smartphone and the fourth client device 140 may be implemented as a tablet. In some non-limiting embodiments of the present technology, the communications network 200 can be implemented as the Internet. In other embodiments of the present technology, the communications network 200 can be implemented differently, such as any wide-area communications network, local-area communications network, a private communications network and the like.

How the given communication link 205 is implemented is not particularly limited and will depend on how the associated one of the first client device 110, the second client device 120, the third client device 130 and the fourth client device 140 are implemented. Merely as an example and not as a limitation, in those embodiments of the present technology where at least one of the first client device 110, the second client device 120, the third client device 130 and the fourth client device 140 is implemented as a wireless communication device (such as a smart-phone), the associated one of the communication link 205 can be implemented as a wireless communication link (such as but not limited to, a 3G communications network link, a 4G communications network link, a Wireless Fidelity, or WiFi® for short, Bluetooth® and the like). In those examples, where at least one of the first client device 110, the second client device 120, the third client device 130 and the fourth client device 140 are implemented respectively as laptop, smartphone, tablet computer, the associated communication link 205 can be either wireless (such as the Wireless Fidelity, or WiFi® for short, Bluetooth® or the like) or wired (such as an Ethernet based connection).

It should be expressly understood that implementations for the first client device 110, the second client device 120, the third client device 130, the fourth client device 140, the communication link 205 and the communications network 200 are provided for illustration purposes only. As such, those skilled in the art will easily appreciate other specific implementational details for the first client device 110, the second client device 120, the third client device 130, the fourth client device 140 and the communication link 205 and the communications network 200. As such, by no means, examples provided herein above are meant to limit the scope of the present technology.

While only four client devices 110, 120, 130 and 140 are illustrated (all are shown in FIG. 1), it is contemplated that any number of client devices 110, 120, 130 and 140 could be connected to the system 100. It is further contemplated that in some implementations, the number of client devices 110, 120, 130 and 140 included in the system 100 could number in the tens or hundreds of thousands.

Search Engine Server

Also coupled to the communications network 200 is the aforementioned search engine server 210. The search engine server 210 can be implemented as a conventional computer server. In an example of an embodiment of the present technology, the search engine server 210 can be implemented as a Dell™ PowerEdge™ Server running the Microsoft™ Windows Server™ operating system. Needless to say, the search engine server 210 can be implemented in any other suitable hardware and/or software and/or firmware or a combination thereof. In the depicted non-limiting embodiment of present technology, search engine server 210 is a single server. In alternative non-limiting embodiments of the present technology, the functionality of the search engine server 210 may be distributed and may be implemented via multiple servers. In some embodiments of the present technology, the search engine server 210 is under control and/or management of a search engine operator. Alternatively, the search engine server 210 can be under control and/or management of a service provider.

Generally speaking, the purpose of the search engine server 210 is to (i) execute searches; (ii) execute analysis of search results and perform ranking of search results in response to a given search query (which may take into account similar queries as determined by the present technology); (iii) group results and compile the search engine result page (SERP) to be outputted to an electronic device (such as one of the first client device 110, the second client device 120, the third client device 130 and the fourth client device 140), the electronic device having been used to submit the given search query that resulted in the SERP.

How the search engine server 210 is configured to execute searches is not particularly limited. Those skilled in the art will appreciate several ways and means to execute the search using the search engine server 210 and as such, several structural components of the search engine server 210 will only be described at a high level. The search engine server 210 may maintain a search log database 212.

In some embodiments of the present technology, the search engine server 210 can execute several types of searches, including but not limited to, a general search and a vertical search.

The search engine server 210 is configured to perform general web searches, as is known to those of skill in the art. The search engine server 210 is also configured to execute one or more vertical searches, such as an images vertical search, a music vertical search, a video vertical search, a news vertical search, a maps vertical search and the like. The search engine server 210 is also configured to, as is known to those of skill in the art, execute a crawler algorithm—which algorithm causes the search engine server 210 to "crawl" the Internet and index visited web sites into one or more of the index databases, such as the search log database 212.

The search engine server 210 is configured to generate a ranked search results list, including the results from the general web search and the vertical web search. Multiple algorithms for ranking the search results are known and can be implemented by the search engine server 210.

Just as an example and not as a limitation, some of the known techniques for ranking search results by relevancy to the user-submitted search query are based on some or all of: (i) how popular a given search query or a response thereto is in searches; (ii) how many results have been returned; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP. The search engine server 210 can thus calculate and assign a relevance score (based on the different criteria listed above) to each search result obtained in response to a user-submitted search query and generate a SERP, where search results are ranked according to their respective relevance scores. In the present embodiment, the search engine server 210 may execute a plurality of machine learning algorithms for ranking documents and/or generate features for ranking documents.

The search engine server 210 typically maintains the above-mentioned search log database 212, the search log database 212 including an index 214

The purpose of the index 214 is to index documents, such as, but not limited to, web pages, images, PDFs, Word™ documents, PowerPoint™ documents, that have been crawled (or discovered) by the crawler of the search engine server 210. In some embodiments of the present technology, the index 214 is maintained in a form of posting lists. As such, when a user of one of the first client device 110, the second client device 120, the third client device 130, and the fourth client device 140 inputs a query and performs a search on the search engine server 210, the search engine server 210 analyzes the index 214 and retrieves documents that contain terms of the query, and ranks them according to a ranking algorithm.

Tracking Server

Also coupled to the communications network 200 is the above-mentioned tracking server 220. The tracking server 220 can be implemented as a conventional computer server. In an example of an embodiment of the present technology, the tracking server 220 can be implemented as a Dell™ PowerEdge™ Server running the Microsoft™ Windows Server™ operating system. Needless to say, the tracking server 220 can be implemented in any other suitable hardware and/or software and/or firmware or a combination thereof. In the depicted non-limiting embodiment of present technology, the tracking server 220 is a single server. In alternative non-limiting embodiments of the present technology, the functionality of the tracking server 220 may be distributed and may be implemented via multiple servers. In other embodiments, the functionality of the tracking server 220 may be performed completely or in part by the search engine server 210. In some embodiments of the present technology, the tracking server 220 is under control and/or management of a search engine operator. Alternatively, the tracking server 220 can be under control and/or management of another service provider.

Generally speaking, the purpose of the tracking server 220 is to track user interactions with search results provided by the search engine server 210 in response to user requests (e.g. made by users of one of the first client device 110, the second client device 120, the third client device 130 and the fourth client device 140). The tracking server 220 may track user interactions (such as, for example, click-through data) when users perform general web searches and vertical web searches on the search engine server 210, and store the user interactions in a tracking database 222.

Non-limiting examples of user interactions tracked by the tracking server 220 include:
- Loss/Win: was the document clicked in response to the search query or not.
- Dwell time: time a user spends on a document before returning to the SERP.
- Long/short click: was the user interaction with the document long or short, compared to the user interaction with other documents on the SERP.
- Click-through rate (CTR): Number of clicks on an element divided by the number of times the element is shown (impressions).

Naturally, the above list is non-exhaustive and may include other types of user interactions without departing from the scope of the present technology. In some embodiments, the tracking server 220 may compile user interaction data (which may, as a non-limiting example, include user interactions for every hour) and generate user interactions to be stored in the tracking database 222 in a suitable format for implementing the present technology (which, may as a non-limiting example, be user interactions for a predetermined period of time of 3 months). In other embodiments, the tracking server 220 may store the user interaction data in raw form in the tracking database 222, such that it can retrieved and compiled by at least one of the search engine server 210, the training server 230, or another server (not depicted) in a suitable format for implementing the present technology.

The tracking server 220 typically maintains the above-mentioned tracking database 222, the tracking database 222 including a query log 226 and a user interaction log 228.

The purpose of the query log 226 is to log searches that were made using the search engine server 210. More specifically, the query log 226 maintains terms of search queries (i.e. the associated search words) and the associated search results. It is noted that the query log 226 is maintained in an anonymized manner—i.e. search queries are not trackable to the users who have submitted the search query.

More specifically, the query log 226 may include a list of queries with their respective terms, with information about documents that were listed by the search engine server 210 in response to a respective query, a timestamp, and may also contain a list of users identified by anonymous IDs (or without an ID altogether) and the respective documents they have clicked on after submitting a query. In some embodiments, the query log 226 may be updated every time a new search is performed on the search engine server 210. In other embodiments, the query log 226 may be updated at predetermined times. In some embodiments, there may be a plurality of copies of the query log 226, each corresponding to the query log 226 at different points in time.

The user interaction log 228 may be linked to the query log 226, and list user interactions as tracked by the tracking server 220 after a user has submitted a query and clicked on one or more documents on a SERP on the search engine server 210. As a non-limiting example, the user interaction log 228 may contain a reference to a document, which may be identified by an ID number or an URL, a list of queries, where each query of the list of queries is associated with a list of documents, and where each document is associated with a plurality of user interactions (if the document was interacted with), which will be described in more detail herein below. The plurality of user interactions may generally be tracked and compiled by the tracking server 220, and in some embodiments may be listed for each individual user.

In some embodiments, the tracking server 220 may send tracked queries, search result and user interactions to the search engine server 210, which may store the tracked queries, user interactions and associated search results in the search log database 212. In alternative non-limiting embodiments of the present technology, the functionality of the tracking server 220 and the search engine server 210 can be implemented by a single server.

Training Server

Also coupled to the communications network is the above-mentioned training server 230. The training server 230 can be implemented as a conventional computer server. In an example of an embodiment of the present technology, the training server 230 can be implemented as a Dell™ PowerEdge™ Server running the Microsoft™ Windows Server™ operating system. Needless to say, the training server 230 can be implemented in any other suitable hardware and/or software and/or firmware or a combination thereof. In the depicted non-limiting embodiment of present technology, the training server 230 is a single server. In alternative non-limiting embodiments of the present technology, the functionality of the training server 230 may be distributed and may be implemented via multiple servers. In the context of the present technology, the training server 230 may implement in part the methods and system described herein. In some embodiments of the present technology, the training server 230 is under control and/or management of a search engine operator. Alternatively, the training server 230 can be under control and/or management of another service provider.

Generally speaking, the purpose of the training server 230 is to train one or more machine learning algorithms (MLAs) used by the search engine server 210, the tracking server 220 and/or other servers (not depicted) associated with the search engine operator. The training server 230 may, as an example, train one or more MLAs associated with the search engine provider for optimizing general web searches, vertical web searches, providing recommendations, predicting outcomes, and other applications. The training and optimization of the MLAs may be executed at predetermined periods of time, or when deemed necessary by the search engine provider.

The training server 230 may maintain a training database 232 for storing training objects and/or features for the different MLAs used by the search engine server 210, the tracking server 220 and/or other servers (not depicted) associated with the search engine operator.

Figure 2:
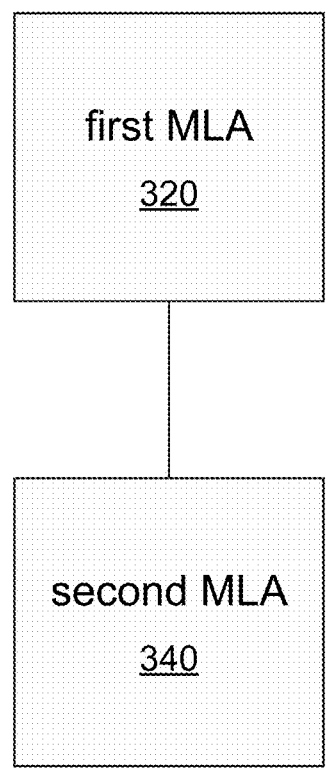
FIG. 2 depicts a schematic diagram of machine learning algorithm based system executable within the system of FIG. 1 in accordance with embodiments of the present technology.

In the embodiments illustrated herein and with reference to FIG. 2, the training server 230 may be configured to train (1) a first MLA 320 for ranking documents on the search engine server 210, (2) a second MLA 340 for generating a set of queries for enriching currently submitted queries, and generating associated similarity parameters, which may be used by the first MLA 320. The first MLA 320 and the second MLA 340, will be described in more detail in the following paragraphs. While the description refers to general web searches for documents such as web pages, the present technology may also be applied at least partially to vertical searches, and to other types of documents, such as images, videos, music, news, and other types of searches. It is noted that in some embodiments, the first MLA 320, and the second MLA 340, may be implemented in more MLAs, or in a single MLA.

With continued reference to FIG. 2, a machine learning system 300 is illustrated in accordance with non-limiting embodiments of the present technology. The machine learning system 300 includes the first MLA 320, and the second MLA 340.

First MLA

The first MLA 320 may generally be configured to rank search results on the search engine server 210 and may, as a non-limiting example, implement a gradient boosted decision tree algorithm (GBRT). Briefly speaking, GBRT is based on decision trees, whereby a prediction model in the form of an ensemble of trees is generated. The ensemble of trees is built in a stage-wise manner Each subsequent decision tree in the ensemble of decision trees focuses training on those previous decision tree iterations that were "weak learners" in the previous iteration(s) of the decision trees ensemble (i.e. those that are associated with poor prediction/high error). Boosting is a method aimed at enhancing prediction quality of an MLA. In this scenario, rather than relying on a prediction of a single trained algorithm (i.e. a single decision tree) the system uses many trained algorithms (i.e. an ensemble of decision trees), and makes a final decision based on multiple prediction outcomes of those algorithms.

In boosting of decision trees, the first MLA 320 first builds a first tree, then a second tree, which enhances the prediction outcome of the first tree, then a third tree, which enhances the prediction outcome of the first two trees and so on. Thus, the first MLA 320 in a sense is creating an ensemble of decision trees, where each subsequent tree is better than the previous, specifically focusing on the weak learners of the previous iterations of the decision trees. Put another way, each tree is built on the same training set of training objects, however training objects, in which the first tree made "mistakes" in predicting are prioritized when building the second tree, etc. These "tough" training objects (the ones that previous iterations of the decision trees predict less accurately) are weighted with higher weights than those where a previous tree made satisfactory prediction.

The first MLA 320 may thus use classification and/or regression for ranking documents. The first MLA 320 may be the main ranking algorithm of the search engine server 210, or may one of the ranking algorithm of the search engine server 210, or may be part of another ranking algorithm of the search engine server 210.

Second MLA

The second MLA 340 may be generally configured to compare search queries, and to generate similarity parameters that are indicative of a similarity level between queries. Once trained, the second MLA 340 may also be configured to determine at least one past query that is similar to a currently submitted query, which may be a new "fresh" query that has not been previously submitted on the search engine server 210, based on at least a similarity analysis of the at least one past query and the currently submitted query.

The second MLA 340 may be trained on a set of training objects to learn relationships between respective queries and similarity parameters, where similarity parameters between the respective pairs of queries have been previously generated, as an example by the search engine server 210 or the training server 230, based on similar search results obtained in response to the queries and associated user interactions with those search results. As a non-limiting example, the second MLA 340 may use textual content and features of queries in a pair, as well as a previously computed similarity parameter based on similar search results of the queries in the pair, to "learn" a correlation between the textual features of the queries and the similarity parameter, which may be used as a "distance" that is indicative of a degree of similarity between queries in a pair.

While the present specification determines similarity of queries based at least partially on similar "search results" and "user interactions", the present technology may be applied to different types of digital files, such as, but not limited to software applications, video games, images, videos, and the like. Further, the present technology does not require a presence of "user interactions" in every embodiment, and other factors or features may or may not be considered instead of user interactions depending on the type of digital files, such as views, time, distance, etc.

Once trained, the second MLA 340 may be able to select one or more similar queries when presented with a new and unseen query, predict similarity parameters, and may provide the one or more similar queries and the similarity parameters to the first MLA 320 such that they can be used as features for ranking search results in response to the new and unseen query. In the embodiment illustrated herein, the second MLA 340 may be implemented as a neural network.

Figure 3:
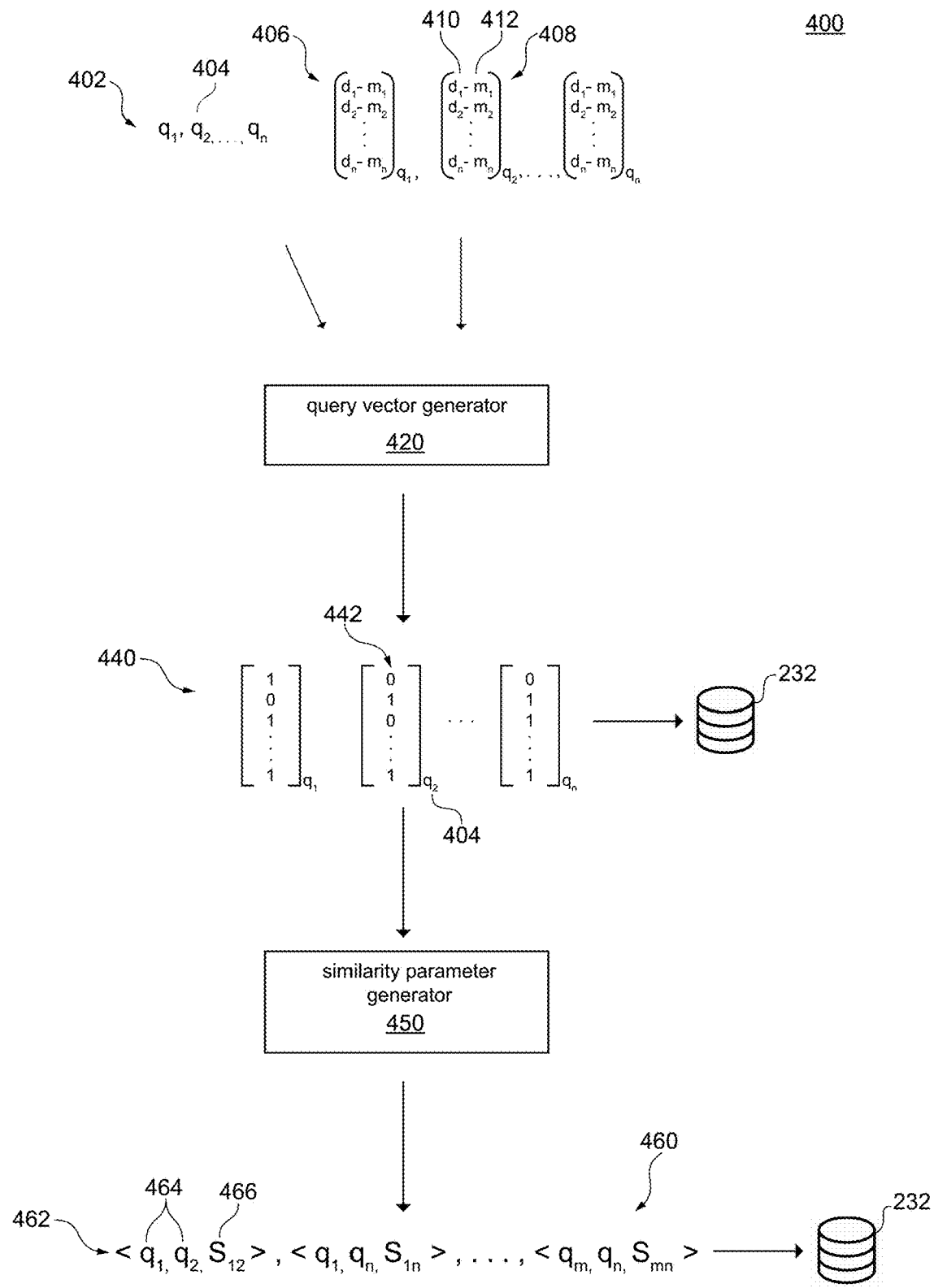
FIG. 3 depicts a schematic diagram of similar query generation routine executable within the system of FIG. 1 in accordance with embodiments of the present technology.

Now turning to FIG. 3, a schematic diagram of a similar query generation routine 400 is illustrated in accordance with non-limiting embodiments of the present technology.

The similar query generation routine 400 may be executed offline and in a synchronous manner (i.e. at predetermined intervals of time) by the training server 230. In alternative embodiments, the similar query generation routine 400 may be executed by the search engine server 210, or another server (not depicted).

Generally speaking, the purpose of the similar query generation routine 400 is to (i) compute respective query vectors for queries that have been previously submitted on the search engine server 210, the query vectors including information about search results presented in response to the query, and in some embodiments, user interactions with the search results; and (ii) compute, by using the query vectors, similarity parameters between previously submitted queries, the similarity parameters being indicative of a degree of similarity between the queries based on similar search results, and in some embodiments, user interactions with the similar search results.

In some embodiments, the similar query generation routine 400 may compute query vectors for previously submitted queries, which may then be stored in the training database 232 (or in another database (not depicted)). The query vectors may then be used by the search engine server 210 upon receiving a current query that has been previously submitted on the search engine server 210, and the search engine server 210 may compute similarity parameters between the current query and past queries based on the associated query vectors stored in the training database 232. The first MLA 320 may then enrich the current query with queries having a respective similarity parameter with the current query above a threshold.

In other embodiments, the similar query generation routine 400 may compute query vectors for previously submitted queries, as well as similarity parameters between the query vectors, and may store the query vectors and the similarity parameters in the training database 232 (or in another database). The search engine server 210, upon receiving a current query that has been previously submitted on the search engine server 210, may retrieve from the training database 232 queries having a respective similarity parameter above a threshold to enrich the current query.

The output of the similar query generation routine 400 may be used by the training server 230 to train the second MLA 340 for enriching an unseen query (i.e. a query that has not been previously submitted on the search engine server 210).

The similar query generation routine 400 includes a query vector generator 420, and a similarity parameter generator 450.

Vector Generator

The query vector generator 420 may generally be configured to retrieve search queries, search results having been presented in response to the search queries, as well as user interactions associated with each of the search results, to generate a respective vector for each query, where the respective vector includes information about the respective search results, as well as the respective user interactions associated with the search results. In some embodiments, the query vector generator 420 may generate a respective vector for each query based only on search results.

The query vector generator 420 may retrieve, from the query log 226 of the tracking database 222 of the tracking server 220, an indication of a plurality of search queries 402. Generally, speaking, each search query 404 in the indication of the plurality of search queries 402 is a search query that has been previously submitted on the search engine server 210. In some embodiments, each search query 404 in the indication of the plurality of search queries 402 may be a reference to the search query, a numerical representation of the search query, or a text of the search query. The indication of the plurality of search queries 402 may include a predetermined number of search queries. The number of search queries 404 in the indication of the plurality of search queries 402 is not limited. As a non-limiting example, the indication of the plurality of the search queries 402 may include the 10,000,000 most popular search queries that have been previously submitted by users (such as user of the first client device 110, the second client device 120, the third client device 130 and the fourth client device 140) on the search engine server 210.

In some embodiments, each search query 404 in the indication of the plurality of search queries 402 may be chosen based on specific criteria, such as, but not limited to: popularity of the query on the search engine server 210, linguistic features of the search query 404, respective search results associated with the search query 404, and the like. In alternative embodiments, each search query 404 in the indication of the plurality of search queries 402 may be chosen randomly.

The query vector generator 420 may retrieve, from the query log 226 and/or the user interaction log 228 of the tracking database 222 of the tracking server 220, an indication of a plurality of search results 406. The indication of the plurality of search results 406 includes, for each search query 404 of the indication of the plurality of search queries, a respective set of search results 408 that was provided in response to the search query 404. Each respective search result 410 of the respective set of search results 408 may be associated with one or more respective user interactions 412. Generally, each of the one or more user interactions 412 may be indicative of user behaviour of one or more users after having submitted the search query 404 on the search engine server 210, where the one or more users may have clicked, or otherwise interacted with one or more search results in the respective set of search results 408 during a search session on the search engine server 210, as an example via one of the first client device 110, the second client device 120, the third client device 130, and the fourth client device 140. In some embodiments, the query vector generator 420 may retrieve one or more specific user interactions that are relevant to the task at hand, and may not necessarily retrieve all user interactions tracked by the tracking server 220 and stored in the user interaction log 228 of the search log database 212.

Generally, the one or more respective user interactions 412 may be an aggregate of user interactions from a plurality of users (e.g. total number of times a given search result 410 has been clicked on), and may not be individual user interactions (i.e. user-specific interactions).

The query vector generator 420 may then, for each respective search query 404 associated with a respective set of search results 408, compute a respective query vector 442, the respective query vector 442 including, for the respective search query 404, information from each of the respective set of search results 408, including the respective search result 410 and the associated user interaction 412.

The manner in which each respective query vector 442 is represented is not limited, and generally the purpose of the respective query vector 442 is to include information about search results and user interactions tracked in response to a query in a vector such that it can be compared with another respective vector, and that a similarity between two queries may be assessed by using the query vectors as a "proxy" by comparing similar search results and respective user interactions.

In the present embodiment, each row or column of the respective query vector 432 associated with the respective search query 404 may correspond to a respective search result 410 of the respective set of search results 408, and each element may correspond to a presence of a respective user interaction 412, e.g. an element may be equal to 1 if there is a user interaction or if the user interaction is above a predetermined threshold, and 0 if there is no user interaction, or if the user interaction is below the predetermined threshold. In other embodiments, an element of a vector may have a value of the respective user interaction 412 associated with the respective search result 410. The respective query vector 432 may also be represented in binary form.

In some embodiments, when more than one type of user interaction is considered for a respective search result 410, each respective query vector 432 may be represented as a matrix or, or there may be more than one respective query vector 432 per respective search query 404 (each corresponding to a different type of user interaction).

The query vector generator 420 may then output a plurality of query vectors 440, each query vector 442 being associated with a respective search query 404 of the indication of the plurality of search queries 402.

In some embodiments, the plurality of query vectors 440 may be stored in the training database 232 of the training server 230 for a later use. In other embodiments, the plurality of query vectors 440 may be stored in the query vector database of the search engine server 210, such that comparison of query vectors as will be described below may be executed only when the search engine server 210 receives a current query from a user associated with a client device (such as one of the first client device 110, the second client device 120, the third client device 130 and the fourth client device 140).

Similarity Parameter Generator

The similarity parameter generator 450 may receive as an input the plurality of query vectors 440, and output a set of similarity tuples 460, each tuple 462 in the set of similarity tuples 360 including a pair of queries 464, and a respective similarity parameter 466, the respective similarity parameter 466 being indicative of a similarity level between the two queries in the pair of queries 464.

Generally, the purpose of the similarity parameter generator 450 is to compute, for each possible respective pair of queries 464 within the indication of the plurality of search queries 402, the respective similarity parameter 466. The respective similarity parameter 466 is indicative of a similarity level between the queries included in the pair of queries 464, based on at least one of: (i) similar search results obtained in response to the queries of the pair of queries 464; and (ii) user interactions with the respective similar search results. The similarity level may be assessed by comparing the query vectors associated with each of the queries in the pair of queries.

As a non-limiting example, in the present embodiment, the respective similarity parameter 466 for the pair of queries 464 may be obtained by performing a scalar multiplication of their respective associated query vectors 442 in the set of query vectors 440. As such, the respective similarity parameter 466 may be directly indicative of the similarity between the queries via their search results and user interactions. As a non-limiting example, the respective similarity parameter 466 having a value of 10 may indicate that the two search queries in the pair of queries 464 have at least 10 similar search results, and that the 10 similar results have a presence of user interactions, such as the CTR (where as a non-limiting example, for a given search result in the query vector, the presence of CTR above a predetermined threshold of 0.6 has a value of 1, and the presence of CTR below the predetermined threshold of 0.6 has a value of 0). In some embodiments, the respective similarity parameter may be relative, e.g. if there are 10 similar search results that have a CTR on a total of 20 search results, the respective similarity parameter 466 may be 10/20=0.5 or 50%. In some embodiments, the respective similarity parameter 466 may be weighted based on different criteria. In alternative embodiments, where the query vector 442 includes the values of each user interactions, the respective similarity parameter 466 may be a result of a scalar multiplication of those values. As a non-limiting example, for a pair of queries 464 having 3 similar search results, with a first query vector of the pair of queries 464 having CTR values of (0.2 0.5 0.7) for the 3 search results, and a second query vector of the pair of queries 464 having CTR values of (0.65 0.2 0.4) for the 3 search results, the respective similarity parameter 466 may be computed by performing: 0.2*(0.65)+0.5*(0.2)+0.7*(0.4)=0.51 (e.g. the results that are not similar may be ignored).

In embodiments where more than one type of user interaction is associated with each search result, there may be more than one respective similarity parameter 466 in a tuple 472 for each pair (each corresponding to a different type of user interaction), or the respective similarity parameter 466 in a tuple 472 may be a sum of the respective similarity parameters.

In alternative embodiments, other methods known in the art may be used to quantify a similarity between queries based on similar search results and user interactions, such as, but not limited to, cosine similarity, bipartite graphs, and Pearson correlation coefficient.

The similarity parameter generator 450 may then output the set of similarity tuples 460. The set of similarity tuples 460 includes the respective tuple 462 for each possible pair of search queries, each tuple 462 being in the form $<q_i, q_j, S_{ij}>$, the tuple 462 including an indication of a first query $q_i$ of the pair of queries 464, an indication of a second query $q_j$ of the pair of queries 464, and the similarity parameter $S_{ij}$ 466 between the first query $q_i$ and second query $q_j$.

The set of similarity tuples 460 may be stored in the training database 232 of the training server 230, or in another database, such a database (not depicted) connected the search engine server 210.

As a non-limiting example, each respective tuple 462 may be stored as a training object of a set of training objects (not depicted) in the training database 232 of the training server 230. Further, in some embodiments, each respective tuple 462 saved as a training object may also include the respective query vectors 442 associated with each of the indication of queries in the pair of queries 464.

Figure 4:
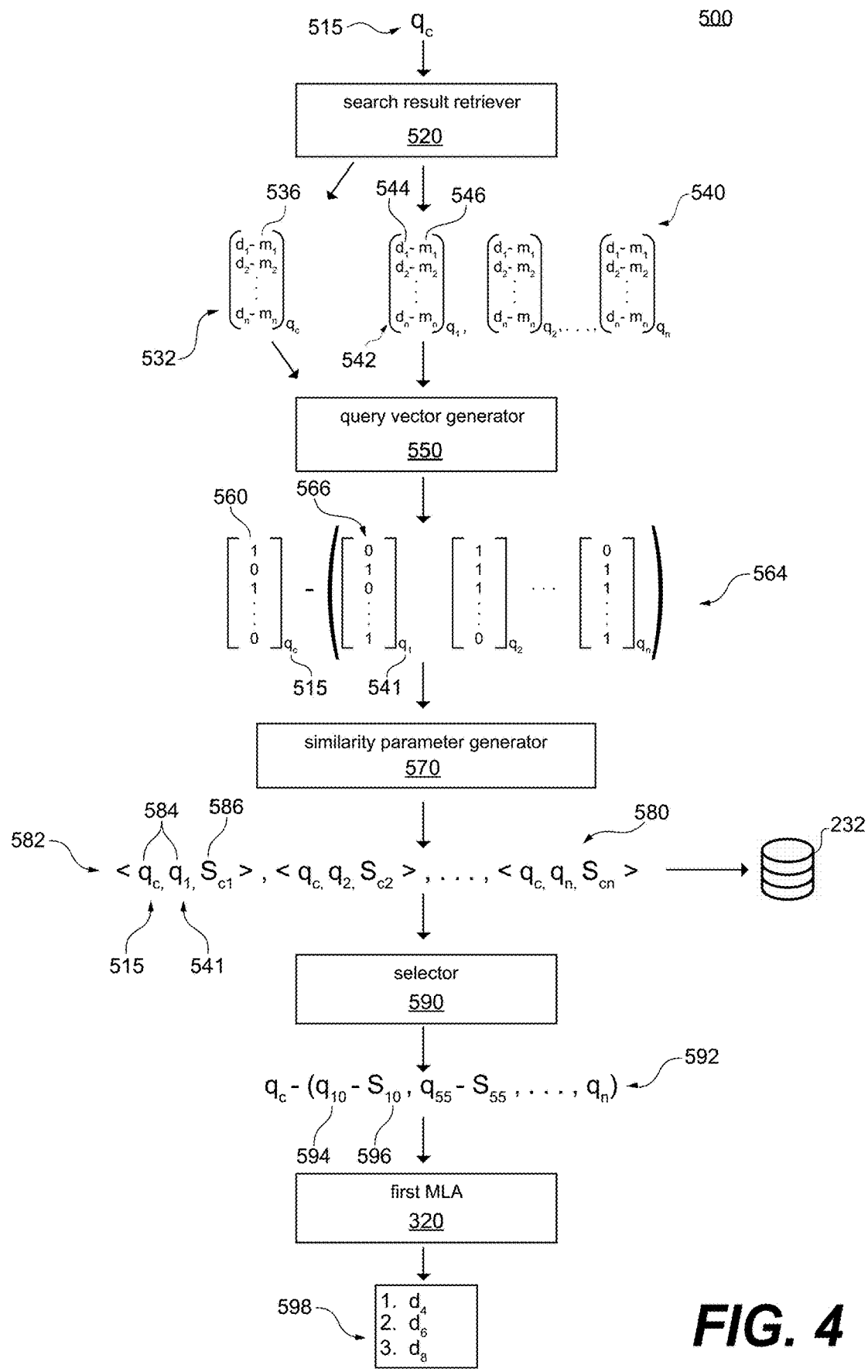
FIG. 4 depicts schematic diagram of an query enrichment routine executable within the system of FIG. 1 in accordance with non-limiting embodiments of the present technology.

Now turning to FIG. 4, a schematic diagram of a query enrichment routine 500 is illustrated in accordance with non-limiting embodiments of the present technology.

The query enrichment routine 500 may be executed by search engine server 210. In some embodiments, the query enrichment routine 500 could be executed by the training server 230 or by another server (not depicted). The output of the query enrichment routine 500 could be used by the training server 230 to train the second MLA 340 for enriching an unseen query that has never been previously submitted on the search engine server 210.

The query enrichment routine 500 includes a search result retriever 520, a query vector generator 550, a similarity parameter generator 570, a selector 590, and the first MLA 320.

The query enrichment routine 500 may be executed when an indication of a current query 515 is received at the search engine server 210.

In some embodiments, where a plurality of query vectors have been previously stored in the training database 232, as an example during the similar query generation routine 400, the query enrichment routine 500 may begin at the similarity parameter generator 570. In other embodiments, where a plurality of query vectors has not been previously stored in the training database 232, the query enrichment routine 500 may begin at the search result retriever 520.

Search Result Retriever

The search result retriever 520 may receive an indication of a current query 515 from the search engine server 210, or directly from one of the first client device 110, the second client device 120, the third client device 130 and the fourth client device 140. Upon receiving the indication of the current query 415, the search result retriever 520 may generate a set of current search results 532 in response to the current query 515. The search result retriever 520 may generate the set of current search results 532 in a manner similar to when a user of an electronic device submits a query on the search engine server 210, and the search engine server 210 retrieves, from the index 214, a set of documents (or an indication thereof) relevant to the query to be presented as search results. Generally speaking, the indication of the current query 515 is an indication of a query that has been previously submitted on the search engine server 210, and that has respective user interactions 536 associated with each search result 534 of the set of current search results 532. In alternative embodiments, where user interactions are not taken into account, the indication of the current query 515 may or may not have been previously submitted on the search engine server 210.

In some embodiments, where a plurality of query vectors have not been previously stored in the training database 232, the search result retriever 520 may retrieve a plurality of queries and search results 540, the plurality of queries and search results 540 having been retrieved based on the set of current search results 532 associated with the current query 515, where each set of search results 542 has been presented in response to a respective query 541. Each set of search results 542 generally contains one or more respective search results similar to search results in the set of current search results 532 to be provided in response to the current query 515. Each respective search result 544 in the set of search results 542 is associated with respective user interactions having been performed by a respective plurality of users after submitting the respective query 541.

The search result retriever 520 may then output the plurality of queries and search results 540, and the set of current search results 532 associated with the current query 515.

Query Vector Generator

The plurality of queries and search results 540, and the set of current search results 532 associated with the current query 515 may then be received at the query vector generator 550.

The query vector generator 550 is configured in a manner similar to the query vector generator 420 of FIG. 3. The query vector generator 550 may generate a current query vector 560 for the set of current search results 532 associated with the current query 515, as an example if the training database 232 does not include the current query vector 560 (which may have been previously generated, as an example by the query vector generator 420 of FIG. 3).

The query vector generator 550 may generate a set of query vectors 564 for the plurality of queries and search results 540, the set of query vectors 564 including a respective query vector 566 for each of the set of search results 542 associated with the respective query 541.

In some embodiments, where the training database 232 includes a plurality of previously generated query vectors (which may have been generated offline by the query vector generator 420 of FIG. 3), the query vector generator 550 may retrieve at least a portion of the set of query vectors 562 from the training database 232, and may generate another portion of the set of query vectors 562, if it has no been previously generated and stored in the training database 232.

The query vector generator 550 may output the current query vector 560, the current query vector 560 being associated with the indication of the current query 515. The query vector generator 550 may output the set of query vectors 564, where each respective query vector 566 represents a respective set of search results 542 associated with the respective query 541 in the plurality of queries and search results 540.

Similarity Parameter Generator

The current query vector 560, and the set of query vectors 564 may be received at the similarity parameter generator 570.

The similarity parameter generator 570 is configured in a manner similar to the similarity parameter generator 450 of FIG. 3. The similarity parameter generator 570 may generate a respective similarity parameter 586 between the current query 515 and each respective query 541 in the plurality of queries and search results 540 via the current query vector 560 and each respective query vector 566 in the set of query vectors 564.

As a non-limiting example, in the present embodiment, the respective similarity parameter 586 for a given pair of queries 584 including the current query 515 and the respective query 541 may be obtained by performing a scalar multiplication of the respective query vectors 566 in the set of query vectors 564 and the current query vector 560. In alternative embodiments, other methods known in the art may be used to quantify similarity between queries based on similar search results and user interactions, such as, but not limited to, cosine similarity, bipartite graphs, and Pearson correlation coefficient.

The similarity parameter generator 570 may output a set of similarity tuples 580, each respective similarity tuple 582 in the set of similarity tuples 580 including a pair of queries 584 and a respective similarity parameter 466, the respective similarity parameter 586 being indicative of a similarity level between the current query 515 and the respective query 541 in the pair of queries 584.

In some embodiments, the set of similarity tuples 580 may be stored in the training database 232.

Selector

The set of similarity tuples 580 may then be received at the selector 590.

Generally speaking, the purpose of the selector 590 is to select a subset of queries 592 from the plurality of queries and search results 540 via the set of similarity tuples 580. The manner in which the subset of queries 592 is selected is not limited.

The selector 590 may select each respective query 594 of the subset of queries 592 based on the respective similarity parameter 596 between the current query 515 and the respective query 594 in the set of similarity tuples 580 being above a predetermined threshold. Additionally, or alternatively, the selector 590 may select a predetermined number of queries associated with top similarity parameters values (e.g. queries associated with the top 5 similarity parameters in the set of similarity tuples 580 may be chosen).

The selector 590 may then output the subset of queries 592, where each respective query 594 of the subset of queries 592 is associated with a respective similarity parameter 596 and has been selected based on: the respective similarity parameter 596 between the current query 515 and the respective query 594 being above a predetermined threshold and/or the respective similarity parameter 596 between the current query 515 and the respective query 594 being in a predetermined number of top similarity parameters values. The subset of queries 592 may be used to enrich the current query 515 to rank the set of current search results 532 associated with the current query 515. The manner in which the subset of queries 592 is used to enrich the current query 515 is not limited.

Enrichment of the Current Query

The subset of queries 592 may then be received by the first MLA 320 of the search engine server 210. In some embodiments, the first MLA 320 may have been previously trained on the training server 230 to rank search results based on similar search queries.

The subset of queries 592 may be included in the ranking function of the first MLA 320, such that the first MLA 320 includes terms of each respective query 594 of the subset of queries 592, which may be taken into account when ranking each respective search result 534 in the set of current search results 532. The subset of queries 592 could be used as ranking features for ranking the set of current search results 532 in response to the current query 515 by the first MLA 320.

As a non-limiting example, one or more of the search results in the set of current search results 532 could have their rank "promoted" because they contain the terms of one or more queries in the subset of queries 592. Additionally, or alternatively, the respective similarity parameter 596 associated with each respective query 594 in the subset of queries 592 could be used to weigh an influence of the search terms in the ranking, i.e. a given query in the subset of queries 592 with a higher similarity parameter may be given more importance when ranking each respective search result 534 in the set of current search results 532.

The first MLA 320 may then output a SERP 598, where the set of current search results 532 generated in response to the current query 515 has been ranked by the first MLA 320 by taking into account the subset of queries 592. As a non-limiting example, a given search result in the set of current search results 532 that would have been ranked at a low rank, on a third or fourth page of the SERP, and which would have less chances of being interacted with if the subset of queries 592 would not have been taken into account, could be ranked among the first five search results in the SERP, because the given search result includes a portion of the terms of the queries in the subset of queries 592, and could include useful information that a user is looking for, and that he could have missed if the given search result was not promoted to a higher rank.

Figure 5:
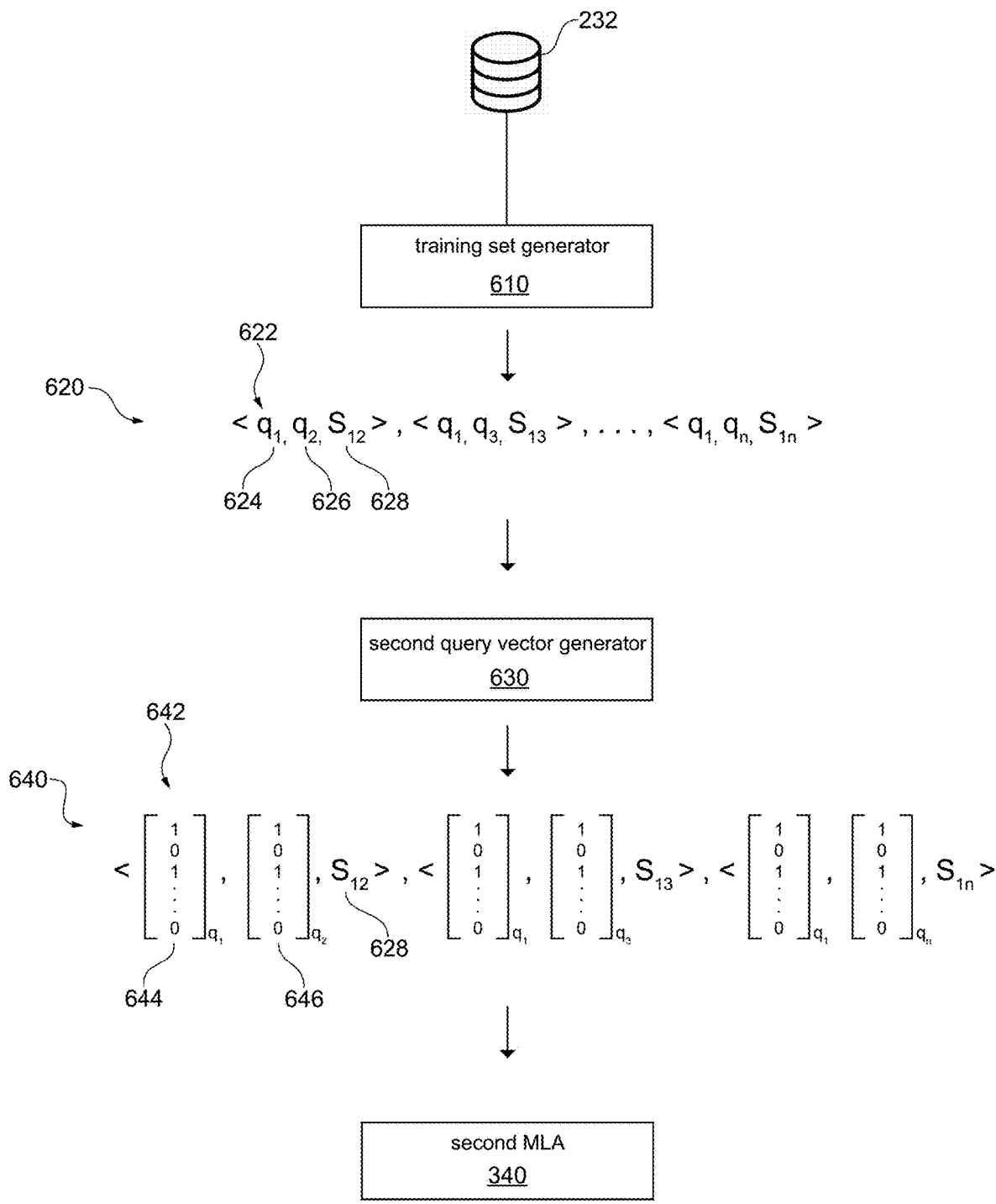
FIG. 5 depicts a schematic diagram of a training phase of a second MLA executable within the system of FIG. 1 in accordance with non-limiting embodiments of the present technology.

With reference to FIG. 5, a schematic diagram of a training phase 600 of the second MLA 340 is illustrated in accordance with non-limiting embodiments of the present technology.

The training phase 600 of the second MLA 340 may be executed by the training server 230.

Generally speaking, the training phase 600 of the second MLA 340 may be executed when the training database 232 includes a number of training objects or tuples that is over a predetermined threshold. As a non-limiting example, the training phase 600 may be executed when there are 100,000,000 tuples stored in the training database 232, such as tuples generated during the similar query generation routine 400 of FIG. 3 and/or the query enrichment routine 500 of FIG. 4.

The training phase 600 includes a training set generator 610, a second query vector generator 630, the second MLA 340, and a database compiler 660.

Training Set Generator

Generally speaking, the purpose of the training set generator 610 is to acquire from the training database 232, a plurality of tuples 620, each respective tuple 622 including a respective first query 624, a respective second query 626, and a respective similarity parameter 628 between the respective first query 624 and the respective second query 626, the respective similarity parameter 628 being indicative of degree of similarity between the respective first query 624 and the respective second query 626. The respective similarity parameter 628 has been previously generated during at least one of the similar query generation routine 400 of FIG. 3 and the query enrichment routine 500 of FIG. 4 by comparing the respective query vectors (not depicted) associated with each of the respective first query 624 and the respective second query 626, the respective query vectors including respective search results and respective user interactions performed by respective users in response to the respective first query 624 and the respective second query 626.

In some embodiments, respective tuples 622 in the plurality of tuples 620 that include a similar query may be associated together.

Second Query Vector Generator

The plurality of tuples 620 may be received as an input at the second query vector generator 630. The purpose of the second query vector generator 630 is to generate a second set of training objects 640, each respective training object 642 including a respective first query vector 644 for the respective first query 624, a respective second query vector 646 for the respective second query 626, and the respective similarity parameter 628 between the respective first query 624 and the respective second query 626.

Generally speaking, the second query vector generator 630 may generate, for each respective training object 642 of the second set of training objects 640, the respective first query vector 644 for the respective first query 624 based on the terms of the respective first query 624, and the respective second query vector 646 for the respective second query 626 based on the terms of the respective second query 626 by using a word embedding algorithm.

Generally, the purpose of a word embedding algorithm is to represent a word as a vector of real numbers by using a set of language modeling and features learning techniques in natural language processing (NLP). The type of the word embedding algorithm is not limited, and some examples include, but are not limited to: word2vec or Latent Dirichlet Allocation algorithms can be used. The selected one or more word embedding algorithms are configured to create a query vector such that query vectors of queries that have similar texts are generally similar. In other words, the selected one or more word embedding techniques ensure that similar queries get mapped into similar query vectors (i.e. item vectors that are proximate in a multi-dimensional space). In some embodiments, the second query vector generator 630 may be an MLA trained to generate word embeddings, such as but not limited to a neural network.

The second query vector generator 630 may output the second set of training objects 640.

Second MLA

The set of training objects 640 may be received as an input at the second MLA 340, which may be trained on each training object 642 of the set of training objects 640, each training object 642 including the respective first query vector 644, the respective second query vector 646 and the respective second similarity parameter 648, which may be used as a label for training the second MLA 340.

Generally speaking, the purpose of the second MLA 340, after the training phase 600, is to be able to compute a respective similarity parameter between a new unseen query (i.e. a query which has not been previously submitted on the search engine server 210 and/or a query which the second MLA 340 has not been trained on) represented by a respective query vector obtained by a word embedding, and a previously submitted query represented by a respective query vector obtained by a word embedding.

In some embodiments, the second MLA 340 may implement a k-nearest neighbors search (k-NNS) type algorithm, where the k-NNS algorithm assumes a distance function has been defined (such as the respective second similarity parameters 648 in the set of training objects 640) between data elements (such as the first query vector 644 and the second query vector 646 in each training object 642 in the set of training objects 640) and aims to find the K query vectors from the set of training objects 640 which minimizes a distance to a given query vector.

In the present embodiment, the second MLA 340 implements a Hierarchical Navigable Small World (HNSW) algorithm, which is a graph based incremental K Approximate Nearest Neighboors Search (K-ANNS) structure. Briefly speaking, the HNSW algorithm is a search structure based on a navigable small world graph with vertices corresponding to the stored elements (i.e. query vectors), edges to links between them, and a variation of greedy algorithm for searching. The HNSW algorithm starts from a vertex entry point, computes a distance (i.e. a second similarity parameter based on the query vectors generated by the second query vector generator 630) from a query q to each vertex from the friend list of the current vertex (which may contain query vectors similar to the query vector of query q), and then selects a vertex with the minimal distance. If the distance between the query and the selected vertex is smaller than the one between the query and the current element, then the algorithm moves to the elected vertex, and it becomes new current vertex. The algorithm stops when it reaches a local minimum: a vertex whose friend list does not contain a vertex that is closer to the query than the vertex itself. The element which is a local minimum with respect to the query q can be either the true closest element to the query q from all elements in the set X, or a false closest (an error).

Thus, once trained, the second MLA 340 implementing the HNSW algorithm may receive a new unseen query (not depicted), may compute a query vector of the new query (not depicted), and may retrieve a subset from a set of queries (not depicted) stored in the training database 232, where each respective query (represented by a respective query vector) of the subset of queries has a minimal distance with the query vector of the new query. Thus, $$\frac{1}{\text{minimal distance}}$$

may be a second similarity parameter, the second similarity parameter being indicative of a degree of similarity between the query and the respective query of the subset of queries via the query vector of the new query and the respective query vector of the respective query, which have been generated by the second query vector generator 630.

Generally speaking, the second MLA 340 may compute similarity parameters between queries in a pair based on textual features of the queries, which may be analogous to a similarity parameter computed based on similar search results and user interactions. Thus, once trained, the second MLA 340 could compute similarity parameters between any type of queries (i.e. seen or unseen queries), and in instances when a similarity parameter is computed between seen queries based on their textual features, the similarity parameter may be comparable to a similarity parameter computed based on similar search results and/or user interactions.

Figure 6:
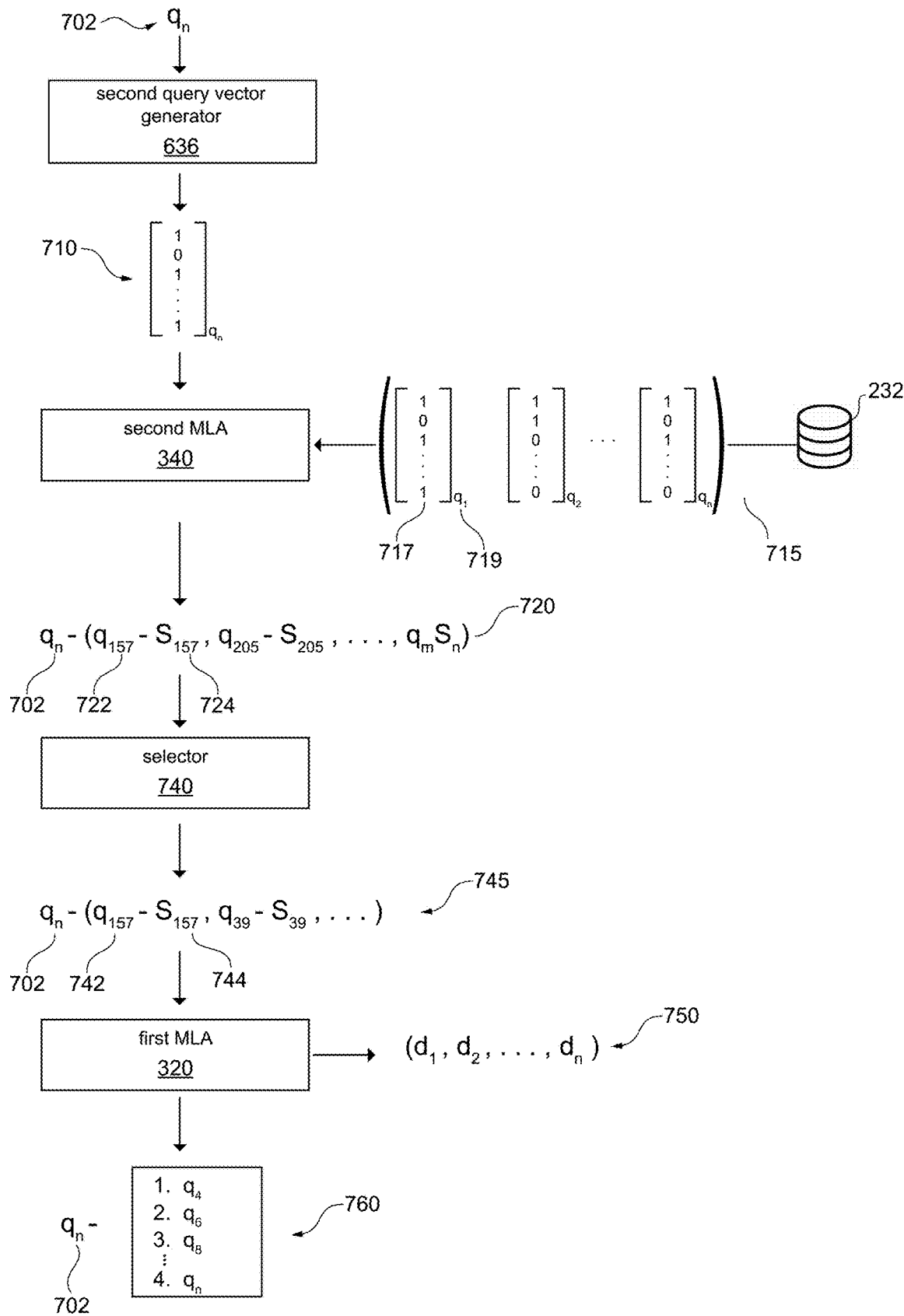
FIG. 6 depicts a schematic diagram of an in-use phase 700 of the second MLA executable within the system of FIG. 1 in accordance with non-limiting embodiments of the present technology.

Now turning to FIG. 6, a schematic diagram of an in-use phase 700 of the second MLA 340 is illustrated in accordance with non-limiting embodiments of the present technology. The in-use phase 700 of the second MLA 340 may be executed by the search engine server 210. In other embodiments, the in-use phase 700 may be executed by a combination of the training server 230 and the search engine server 210.

The in-use phase 700 includes the second query vector generator 630, the second MLA 340, a selector 740, and the first MLA 320.

The second query vector generator 630 may receive as an input a new query 702, the new query 702 not having been previously submitted on the search engine server 210.

The second query vector generator 630 may generate a new query vector 710 based on terms of the new query 702 by using a word embedding algorithm. The second query vector generator 630 may then output the new query vector 710, the new query vector being associated with the new query 702.

The new query vector 710 may then be received as an input by the second MLA 340. The second MLA 340 may implement the HNSW algorithm, compute a second similarity parameter 724 between the new query vector 710 and a plurality of query vectors 715 stored in the training database 232, each respective query vector 717 being associated with a respective query 719. The second MLA 340 may then output a set of queries 720 based on the plurality of query vectors 715, each respective query 722 of the set of queries 720 being associated with a respective second similarity parameter 724, the second similarity parameter 724 being indicative of a degree of similarity between the respective query 722 and the new query 702 based on at least one textual feature of the respective query 722 (i.e. respective query vector) and at least one textual feature of the new query 702 (i.e. new query vector 710).

The set of queries 720 may then be received at the selector 740. The selector 740 may select a subset of queries 745 from the set of queries 720 based on the respective second similarity parameter 724 being above a predetermined threshold.

Additionally or alternatively, the selector 740 may select a predetermined number of queries having a highest second similarity parameter value from the set of queries 720 to include in the subset of queries 745. The subset of queries 745 may then be used to enrich the new query 702.

In some embodiments, the functionality of the selector 740 may be implemented in the second MLA 340, i.e. the second MLA 340 may only retrieve queries being associated with a respective second similarity parameter 724 that is over a threshold, and directly output the subset of queries 745.

The subset of queries 745 may then be received at the first MLA 320. The first MLA 320 may retrieve, from the index 214, a set of search results 750 based on terms of the new query 702. The first MLA 320 may then rank the set of search results 750 to obtain a SERP 760. In some embodiments, the first MLA 320 may retrieve the set of search results 750 when the indication of the new query 702 is received at the second query vector generator 630.

The subset of queries 745 may be included in the ranking function of the first MLA 320, such that the first MLA 320 includes terms of each respective query 742 of the subset of queries 745, which may taken into account when ranking the set of search results 750. The subset of queries 745 could be used as ranking features for ranking the set of search results 750 in response to the new query 702 by the first MLA 320.

As a non-limiting example, one or more of the search results in the set of search results 750 could have their rank "promoted" because they contain the terms of queries in the subset of queries 745. Additionally or alternatively, the respective similarity parameters 744 associated with each respective query 742 in the subset of queries 745 could be used to weigh the influence of the search terms in the ranking, i.e. a given query in the subset of queries 745 with a higher second similarity parameter may be given more importance when ranking the set of search results 750.

The first MLA 320 may then output the SERP 760, where the set of search results 750 generated in response to the new query 702 has been ranked by taking into account or has been "enriched" by the subset of queries 745.

Figure 7:
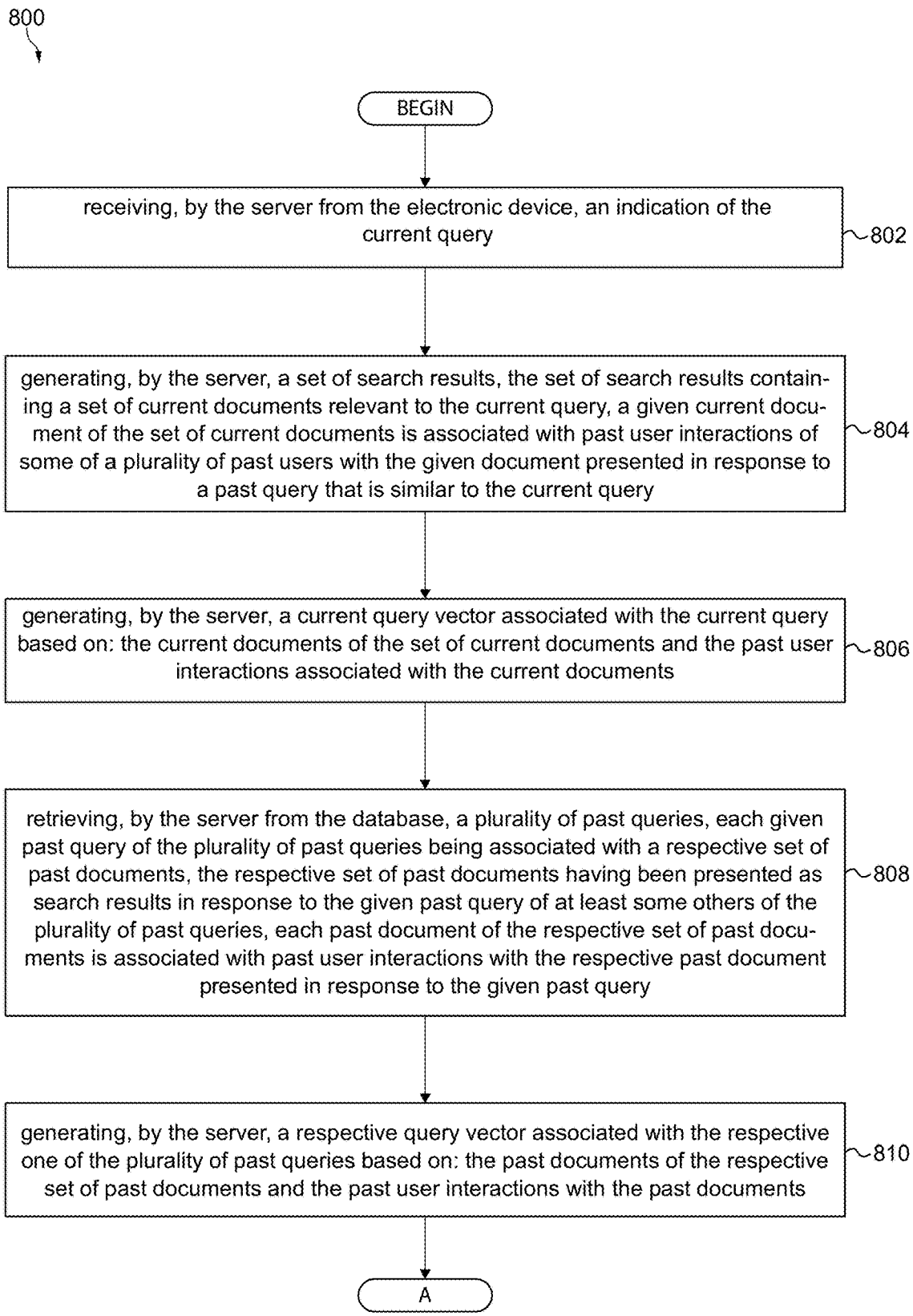
FIGS. 7 and 8 depict a block diagram of a method for ranking search results using a first MLA, the method executable within the system of FIG. 1 in accordance with embodiments of the present technology.
Figure 8:
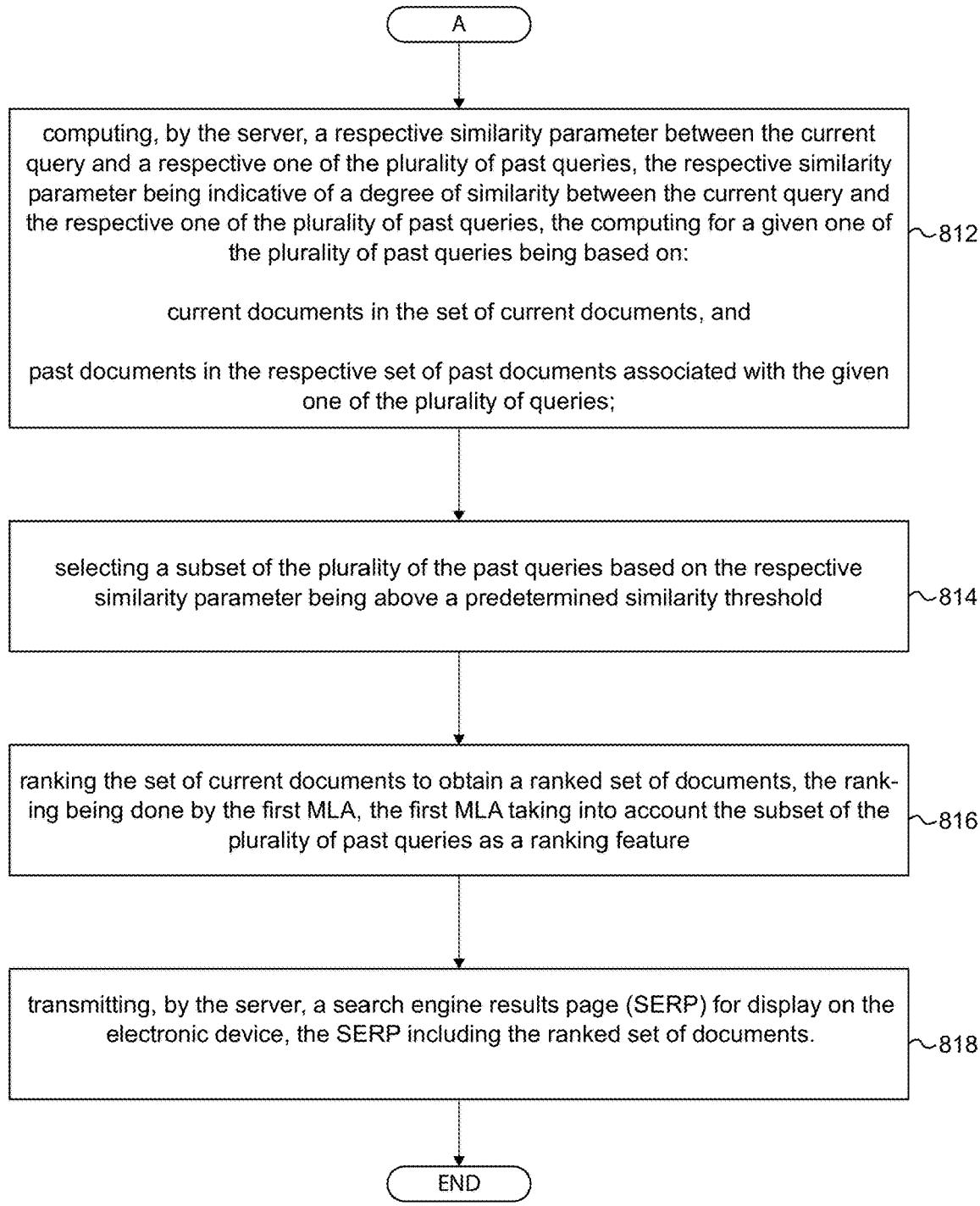

FIGS. 7 and 8 depict a flowchart of a method 800 of ranking search results in response to a current query using the first MLA 320 in accordance with non-limiting embodiments of the present technology.

The method 800 may be executed by the search engine server 210 when the search engine server 210 receives a query having been previously submitted on the search engine server 210, and having user interactions with search results presented in response to the query.

The method 800 may begin at step 802.

STEP 802: receiving, by the server from the electronic device, an indication of the current query At step 802, the search engine server 210 may receive, from one of the first client device 110, the second client device 120, the third client device 130, the fourth client device 140, an indication of a current query 515, the indication of the current query 515 being an indication of a query having been previously submitted on the search engine server 210.

The method 800 may then advance to step 804.

STEP 804: generating, by the server, a set of search results, the set of search results containing a set of current documents relevant to the current query, a given document of the set of current documents being associated with past user interactions of some of a plurality of past users with the given document presented in response to a past query that is similar to the current query At step 804, upon receiving the indication of the current query 515, the search result retriever 520 may generate an indication of a set of current search results 532 in response to the current query 515, the set of current search results 532 being relevant to the indication of the current query 515. The search result retriever 520 may generate the set of current search results 532 in a manner similar to when the search engine server 210 receives a search query and generates search results in response thereto: by retrieving, from the index 214, a set of documents (or an indication thereof) associated the terms of the query to be presented as search results. Each respective search result 534 in the set of current search results 532 is associated with respective user interactions 536 having been performed by a respective plurality of users after submitting the current query 515.

The method 800 may then advance to step 806.

STEP 806: generating, by the server, a current query vector associated with the current query based on: the current documents of the set of current documents and the past user interactions associated with the current documents At step 806, the query vector generator 550 may generate a current query vector 560 associated with the indication of current query 515 based on the set of current search results 532, each respective search result 534 being associated with respective user interactions 536.

The method 800 may then advance to step 808.

STEP 808: retrieving, by the server from the database, a plurality of past queries, each given past query of the plurality of past queries being associated with a respective set of past documents, the respective set of past documents having been presented as search results in response to the given past query of at least some others of the plurality of past queries, each past document of the respective set of past documents is associated with past user interactions with the respective past document presented in response to the given past query At step 808, the search result retriever 520 may then retrieve, from the query log 226, and/or the user interaction log 228, a plurality of queries and search results 540, the plurality of queries and search results 540 having been retrieved based on the set of current search results 532 associated with the current query 515, where each respective set of search results 542 has been presented in response to a respective query 541. Each respective search result 544 in the set of search results 542 is associated with respective user interactions 546 having been performed by a respective plurality of users after submitting the respective query 541.

The method 800 may then advance to step 810.

STEP 810: generating, by the server, a respective query vector associated with the respective one of the plurality of past queries based on: the past documents of the respective set of past documents and the past user interactions with the past documents At step 812, the query vector generator 550 may generate a set of query vectors 564 for the plurality of queries and search results 540, the set of query vectors 564 including a respective query vector 566 for each of the set of search results 542 associated with the respective query 541, each respective query vector 566 being generated based on each respective search result 544 in the set of search results 542 associated with the respective user interactions 546.

The method 800 may then advance to step 812.

STEP 812: computing, by the server, a respective similarity parameter between the current query and a respective one of the plurality of past queries, the respective similarity parameter being indicative of a degree of similarity between the current query and the respective one of the plurality of past queries, the computing for a given one of the plurality of past queries being based on:
  current documents in the set of current documents, and
  past documents in the respective set of past documents associated with the given one of the plurality of queries;

At step 812, the similarity parameter generator 570 may generate a set of similarity tuples 580, each respective similarity tuple 582 including a pair of queries 584 including the current query 515 and the respective query 541, and a respective similarity parameter 586 between the current query 515 and the respective query via the current query vector 560 and the respective query vector 566 in the set of query vectors 564. In some embodiments, the respective similarity parameter 586 may be computed by performing a scalar multiplication of the respective query vectors 566 and the current query vector 560.

The method 800 may then advance to step 814.

STEP 814: selecting a subset of the plurality of the past queries based on the respective similarity parameter being above a predetermined similarity threshold At step 814, the selector 590 may select each respective query 594 to add to a subset of queries 592 based on the respective similarity parameter 586 between the current query 515 and the respective query 541 in the set of similarity tuples 580 being above a predetermined threshold. Additionally or alternatively, the selector 590 may select a predetermined number of queries associated with top similarity parameters values (e.g. the queries associated with the top 5 similarity parameters in the set of similarity tuples 580 may be chosen).

The method 800 may then advance to step 816.

STEP 816: ranking the set of current documents to obtain a ranked set of documents, the ranking being done by the first MLA, the first MLA taking into account the subset of the plurality of past queries as a ranking feature At step 818, the subset of queries 592 may then be used by the first MLA 320 to enrich the current query 515 to rank the set of current search results 532. The subset of queries 592 may be included in the ranking function of the first MLA 320, such that the first MLA 320 includes terms of each respective query 594 of the subset of queries 592, which may be taken into account when ranking the set of current search results 532. The subset of queries 592 could be used as ranking features for ranking the set of current search results 532 in response to the current query 515 by the first MLA 320. The respective similarity parameters 596 associated with each respective query 594 in the subset of queries 592 could be used to weigh the influence of the search terms in the ranking, i.e. a given query in the subset of queries 592 with a higher similarity parameter may be given more importance when ranking the set of current search results 532.

The method 800 may then advance to step 818.

STEP 818: transmitting, by the server, a search engine results page (SERP) for display on the electronic device, the SERP including the ranked set of documents.

At step 818, the search engine server 210 may generate a SERP 598, where the set of current search results 532 generated in response to the current query 515 has been ranked by the first MLA 320 by taking into account the subset of queries 592. The SERP 598 may then be transmitted to the one of the first client device 110, the second client device 120, the third client device 130, and the fourth client device 140.

The method 800 may then end.

Figure 9:
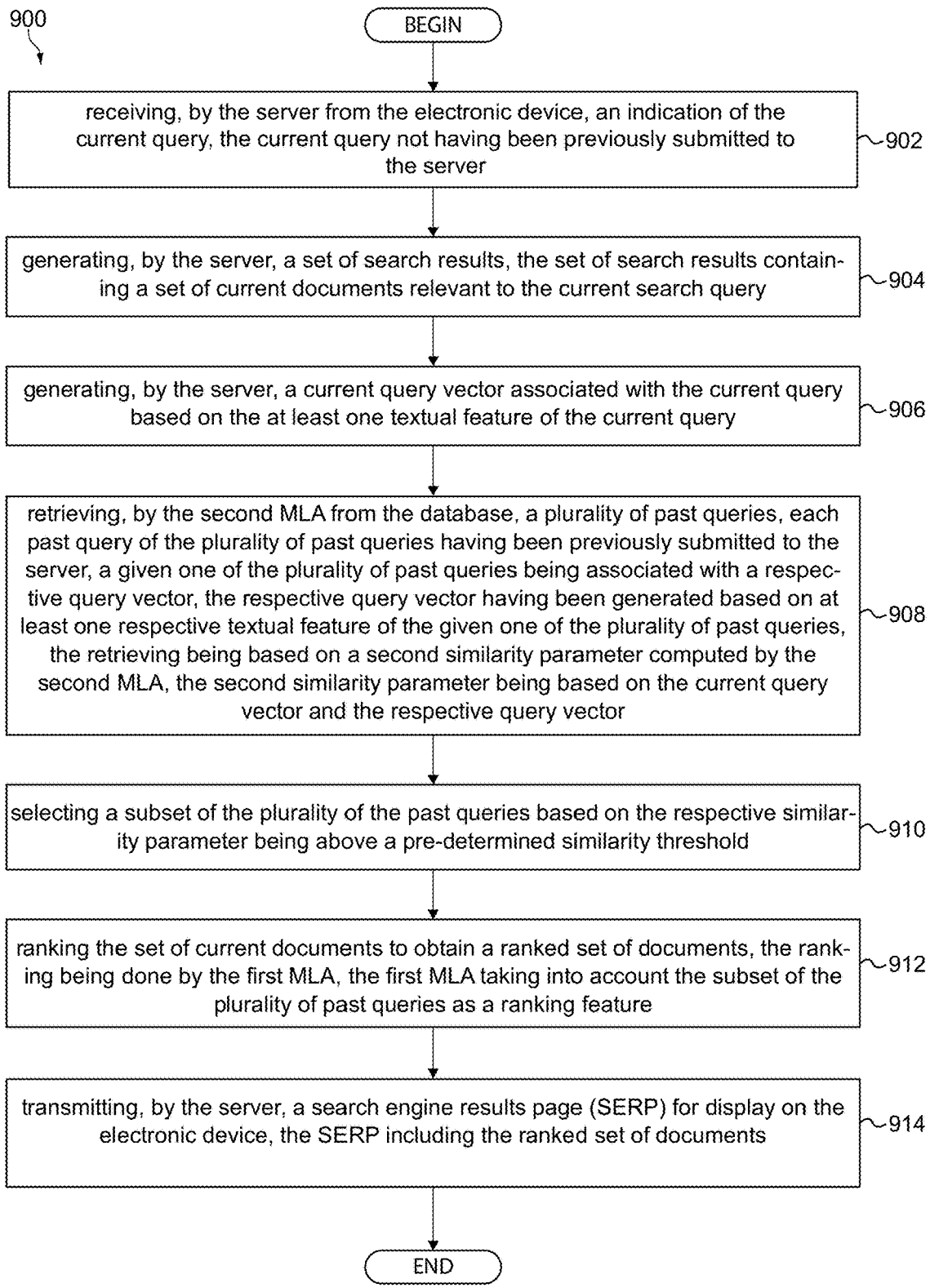
FIG. 9 depicts a block diagram of a method for ranking search results using the first MLA and the second MLA, the method executable within the system of FIG. 1 in accordance with embodiments of the present technology.

FIG. 9 depicts a flowchart of a method 900 of ranking search results in response to a new query using the second MLA 340 and the first MLA 320 in accordance with non-limiting embodiments of the present technology.

Generally speaking, the second MLA 340 has been trained to determine query similarity based on textual content thereof, as an example by having been provided training examples of pairs of queries and similarity parameters that have been previously generated by method 800, and by having been trained to determine a second similarity parameter based on words embeddings of the queries in the pairs via a HNSW algorithm. The method 900 may be executed by the second MLA 340 upon receiving a new query that has not been previously submitted on the search engine server 210 (i.e. no presence of user interactions with searcj results).

In some embodiments, the method 900 may be executed by the second MLA 340 every time a query is received a the search engine server 210, where the query may or may not have been previously submitted on the search engine server 210.

The method 900 may begin at step 902.

STEP 902: receiving, by the server from the electronic device, an indication of the current query, the current query not having been previously submitted to the server At step 902, the second query vector generator 630 may receive, from one of the first client device 110, the second client device 120, the third client device 130, the fourth client device 140, a new query 702, the new query 702 not having been previously submitted on the search engine server 210. In some embodiments, the new query 702 has been previously submitted on the search engine server 210.

The method 900 may then advance to step 904.

STEP 904: generating, by the server, a set of search results, the set of search results containing a set of current documents relevant to the current search query At step 904, The first MLA 320 may generate a set of search results 750. By retrieving, from the index 214, the set of search results 750 based on terms of the new query 702, the set of search results 750 containing search results relevant to the new query 702.

The method 900 may then advance to step 906.

STEP 906: generating, by the server, a current query vector associated with the current query based on the at least one textual feature of the current query At step 906, the second query vector generator 630 may generate a new query vector 710 based on terms of the new query 702 by using a word embedding algorithm.

The method 900 may then advance to step 908.

STEP 908: retrieving, by the second MLA from the database, a plurality of past queries, each past query of the plurality of past queries having been previously submitted to the server, a given one of the plurality of past queries being associated with a respective query vector, the respective query vector having been generated based on at least one respective textual feature of the given one of the plurality of past queries, the retrieving being based on a second similarity parameter computed by the second MLA, the second similarity parameter being based on the current query vector and the respective query vector.

At step 908, the second MLA 340 may implement the HNSW algorithm, and may compute a second similarity parameter 724 between the new query vector 710 and a plurality of query vectors 715 stored in the training database 232, each respective query vector 717 being associated with a respective query 719. The second MLA 340 may then output a set of queries 720, each respective query 722 of the set of queries 720 being associated with a respective second similarity parameter 724, the respective second similarity parameter 724 being indicative of a degree of similarity between the respective query 722 and the new query 702 based on the respective query vector 717 and the new query vector 710.

The method 900 may then advance to step 910.

STEP 910: selecting a subset of the plurality of the past queries based on the respective similarity parameter being above a pre-determined similarity threshold, At step 910, the selector 740 may select a subset of queries 745 from the set of queries 720 based on the respective second similarity parameter 724 being above a predetermined threshold.

The method 900 may then advance to step 912.

STEP 912: ranking the set of current documents to obtain a ranked set of documents, the ranking being done by the first MLA, the first MLA taking into account the subset of the plurality of past queries as a ranking feature At step 912, the subset of queries 745 may be included in the ranking function of the first MLA 320, such that the first MLA 320 includes terms of each respective query 742 of the subset of queries 745, which may be taken into account when ranking the set of search results 750. The subset of queries 745 could be used as ranking features for ranking the set of search results 750 in response to the new query 702 by the first MLA 320. As a non-limiting example, one or more of the search results in the set of search results 750 could have their rank "promoted" because they contain the terms of queries in the subset of queries 745. Additionally or alternatively, the respective similarity parameters associated with each respective query 742 in the subset of queries 745 could be used to weigh the influence of the search terms in the ranking, i.e. a given query in the subset of queries 745 with a higher second similarity parameter may be given more importance when ranking the set of search results 750.

The method 900 may then advance to step 914.

STEP 914: transmitting, by the server, a search engine results page (SERP) for display on the electronic device, the SERP including the ranked set of documents.

At step 914, the first MLA 320 may generate the SERP 760 including the set of search results 750 generated in response to the new query 702, which has been ranked by taking into account the subset of queries 745. The SERP 760 may then be transmitted to the one of the first client device 110, the second client device 120, the third client device 130, and the fourth client device 140.

The method 900 may then end.

The method 800 and method 900 may be executed in parallel or may be combined, as an example by verifying, in the query log 226, a presence of a current query received at the search engine server 210, and in response to the verifying rendering a positive outcome, executing method 800, and in response to the verifying rendering a negative outcome, executing the method 900.

In alternative non-limiting embodiments, once the second MLA 340 has been sufficiently trained (e.g. its error is below a threshold, or based on a decision of the operators of the second MLA 340), the method 900 may be executed every time a query is received at the search engine server 210, where the query may or may not have been previously submitted on the search engine server 210.

It should be apparent to those skilled in the art that at least some embodiments of the present technology aim to expand a range of technical solutions for addressing a particular technical problem, namely improving ranking of a set of search results in response to a given query by enriching a ranking machine learning algorithm with queries deemed similar to the given query, which may allow improving ranking of certain search results in the set of search results. Such technical solutions may allow saving resources such as storage space, bandwidth and time on client devices, as well as on the search engine server.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for ranking search results in response to a current query using a first machine learning algorithm (MLA), the method executable by a server, the server being connected to a database, the server being connected to an electronic device via a communication network, the method comprising:
   receiving, by the server from the electronic device, an indication of the current query;
   generating, by the server, a set of search results, the set of search results containing a set of current documents relevant to the current query, a given current document of the set of current documents being associated with past user interactions of some of a plurality of past users with the given document presented in response to a past query;
   retrieving, by the server from the database, a plurality of past queries, each given past query of the plurality of past queries being associated with a respective set of past documents,
      the respective set of past documents having been presented as search results in response to the given past query of at least some others of the plurality of past queries, each past document of the respective set of past documents being associated with the past user interactions with the respective past document presented in response to the given past query;
   computing, by the server, a respective similarity parameter between the current query and a respective one of the plurality of past queries, the respective similarity parameter being indicative of a degree of similarity between the current query and the respective one of the plurality of past queries, the computing for a given one of the plurality of past queries being based on:
      (i) the degree of similarity between current documents in the set of current documents and past documents in the respective set of past documents associated with the given one of the plurality of queries;
      (ii) the degree of similarity between the past user interactions with current documents in the set of current documents and the past user interactions with past documents in the respective set of past documents associated with the given one of the plurality of queries;
   selecting a subset of the plurality of the past queries based on the respective similarity parameter being above a predetermined similarity threshold;
   ranking the set of current documents to obtain a ranked set of documents, the ranking being done by the first MLA, the first MLA taking into account the subset of the plurality of past queries as a ranking feature; and
   transmitting, by the server, a search engine results page (SERP) for display on the electronic device, the SERP including the ranked set of documents.

2. The method of claim 1, wherein the method further comprises, prior to the retrieving the plurality of past queries:

generating, by the server, a current query vector associated with the current query based on: the current documents of the set of current documents and the past user interactions associated with the current documents; and wherein the method further comprises, prior to the computing the respective similarity parameter between the current query and the respective one of the generating, by the server, a current query vector associated with the current query based on the at least one textual feature of the current query plurality of past queries:

generating, by the server, a respective query vector associated with the respective one of the plurality of past queries based on: the past documents of the respective set of past documents and the past user interactions with the past documents; and wherein the computing the respective similarity parameter is based on the current query vector and the respective query vector.

3. The method of claim 2, wherein the ranking the set of current documents to obtain the ranked set of documents further comprises: taking into account, by the first MLA, the respective similarity parameter between the at least one past query and the current query as a weight of the ranking feature.

4. The method of claim 3, wherein the respective similarity parameter is computed by using one of: a scalar multiplication, and a cosine similarity of the current query vector and the respective query vector.

5. A computer-implemented method for ranking search results in response to a current query using a first machine learning algorithm (MLA), the method being executed by a server hosting a second MLA, the server being connected to a database, the server being connected to an electronic device via a communication network, the second MLA having been trained to determine query similarity based on textual content thereof, the method comprising:

during a training phase:
  acquiring, by the server from a second database connected to the server, a set of training objects, the set of training objects having been previously generated by the server, a given training object of the set of training objects including:
    a first past query and a second past query, the first past query and the second past query having been selected based a respective similarity parameter between the first past query and the second past query, the respective similarity parameter having been calculated based on:
      (i) the degree of similarity between past documents presented in response to the first past query and past documents presented in response to the second past query;
      (ii) the degree of similarity between past user interactions with past documents presented in response to the first past query and past user interactions with past documents presented in response to the second past query;
  training the second MLA on the set of training objects to determine:
    a similarity parameter between a query vector of a new query and the respective query vector of the given past query of the plurality of past queries, the new query not having been previously submitted to the server;
during an in-use phase:

receiving, by the server from the electronic device, an indication of the current query, the current query not having been previously submitted to the server;
retrieving, by the second MLA from the database a plurality of past queries, each past query of the plurality of past queries having been previously submitted to the server;
computing, by the second MLA, a respective similarity parameter between the current query and a respective one of the plurality of past queries, the respective similarity parameter being indicative of a degree of similarity between the current query and the respective one of the plurality of past queries, the computing for a given one of the plurality of past queries being based on:
  at least one textual feature of the current query, and
  at least one textual feature of the given one of the plurality of past queries;
selecting a subset of the plurality of the past queries based on the respective similarity parameter being above a pre-determined similarity threshold,
ranking the set of current documents to obtain a ranked set of documents, the ranking being done by the first MLA, the first MLA taking into account the subset of the plurality of past queries as a ranking feature; and
transmitting, by the server, a search engine results page (SERP) for display on the electronic device, the SERP including the ranked set of documents.

6. The method of claim 5, wherein the method further comprises, prior to the retrieving the plurality of past queries:
  generating, by the server, a current query vector associated with the current query based on the at least one textual feature of the current query;
wherein the method further comprises, prior to the computing the respective similarity parameter:
  acquiring, by the second MLA from the database, a respective query vector associated with the given one of the plurality of past queries, the respective query vector having been generated based on at least one respective textual feature of the given one of the plurality of past queries; and
the computing the respective similarity parameter is based on the current query vector and the respective query vector.

7. The method of claim 6, wherein the retrieving the plurality of past queries is based on the current query vector.

8. The method of claim 5, wherein the similarity parameter being above a predetermined threshold is used as a positive label for the training.

9. The method of claim 5, wherein the ranking the set of current documents to obtain the ranked set of documents further comprises: taking into account, by the first MLA, the respective similarity parameter between the at least one past query and the current query as a weight of the ranking feature.

10. The method of claim 5, wherein:
the training the second MLA comprises using a K-Nearest Neighbor Search (K-NNS) type algorithm; and
the method further comprises, after the training the second MLA:
  generating, by the server in the database, for each past query for the plurality of past queries:
    the respective query vector associated with the given past query, and an indication of the given past query; and
    storing the respective query vector in the database.

11. The method of claim 10, wherein the K-NSS type algorithm is a Hierarchical Navigable Small World (HNSW) algorithm.

12. A computer-implemented method for ranking search results in response to a current query using a first machine learning algorithm (MLA), the method executable by a server, the server being connected to a database, the server being connected to an electronic device via a communication network, the method comprising:
  receiving, by the server from the electronic device, an indication of the current query;
  generating, by the server, a set of search results, the set of search results containing a set of current documents relevant to the current search query;
  determining, by the server, a presence of past user interactions with current documents in the set of current documents, the past user interactions with the current documents having been performed in response to a past query;
  in response to the presence of past user interactions:
    retrieving, by the server from the database, a set of a plurality of past queries, each given past query of the plurality of past queries being associated with a respective set of past documents,
      the respective set of past documents having been presented as search results in response to the given past query of at least some others of the plurality of past queries,
      each past document of the respective set of past documents being associated with past user interactions with the respective past document presented in response to the given past query;
    generating, by the server, a current query vector associated with the current query based on: current documents in the set of current documents and the past user interactions associated with the current documents in the set of current documents;
    generating, by the server, a respective query vector associated with each of the plurality of past queries, the generating being based on: the past documents and the past user interactions with the past documents in the respective set of past documents;
    selecting the plurality of past queries based on the similarity of the current vector and the respective query vector;
  in response to no presence of past user interactions:
    generating, by the server, the current query vector associated with the current query based on at least one textual feature of the current query;
    generating, by the server, a respective query vector associated with each given past query of the plurality of past queries, the generating being based on: at least one textual feature of the given past query;
    selecting the plurality of past queries based on the similarity of the current query vector and the respective query vector;
  ranking the set of current documents to obtain a ranked set of documents, the ranking being done by the first MLA, the first MLA taking into account at least one past query of the set of the plurality of past queries; and
  transmitting, by the server, a search engine results page (SERP) for display on the electronic device, the SERP including the ranked set of documents.

13. A system for ranking search results in response to a current query using a first machine learning algorithm (MLA), the system being connected to a database, the system being connected to an electronic device via a communication network, the system comprising:
  a processor;
  a non-transitory computer-readable medium comprising instructions;
  the processor, upon executing the instructions, being configured to:
    receive from the electronic device, an indication of the current query;
    generate a set of search results, the set of search results containing a set of current documents relevant to the current query, a given current document of the set of current documents being associated with past user interactions of some of a plurality of past users with the given document presented in response to a past query;
    retrieve, from the database, a plurality of past queries, each given past query of the plurality of past queries being associated with a respective set of past documents,
      the respective set of past documents having been presented as search results in response to the given past query of at least some others of the plurality of past queries, each past document of the respective set of past documents being associated with the past user interactions with the respective past document presented in response to the given past query;
    compute a respective similarity parameter between the current query and a respective one of the plurality of past queries, the respective similarity parameter being indicative of a degree of similarity between the current query and the respective one of the plurality of past queries, the computing for a given one of the plurality of past queries being based on:
      (i) the degree of similarity between current documents in the set of current documents and past documents in the respective set of past documents associated with the given one of the plurality of queries;
      (ii) the degree of similarity between the past user interactions with current documents in the set of current documents and the past user interactions with past documents in the respective set of past documents associated with the given one of the plurality of queries;
    select a subset of the plurality of the past queries based on the respective similarity parameter being above a predetermined similarity threshold;
    rank the set of current documents to obtain a ranked set of documents, the ranking being done by the first MLA, the first MLA taking into account the subset of the plurality of past queries as a ranking feature; and
    transmit a search engine results page (SERP) for display on the electronic device, the SERP including the ranked set of documents.

14. The system of claim 13, wherein the processor is further configured to, prior to the retrieving the plurality of past queries:
  generate a current query vector associated with the current query based on: the current documents of the set of current documents and the past user interactions associated with the current documents; and
wherein the processor is further configured to, prior to the computing the respective similarity parameter between the current query and the respective one of the plurality of past queries:

generate a respective query vector associated with the respective one of the plurality of past queries based on: the past documents of the respective set of past documents and the past user interactions with the past documents; and wherein the computing the respective similarity parameter is based on the current query vector and the respective query vector.

15. The system of claim 14, wherein to rank the set of current documents to obtain the ranked set of documents, the processor is further configured to: take into account, by the first MLA, the respective similarity parameter between the at least one past query and the current query as a weight of the ranking feature.

16. The system of claim 15, wherein the respective similarity parameter is computed by using one of: a scalar multiplication, and a cosine similarity of the current query vector and the respective query vector.

17. A system for ranking search results in response to a current query using a first machine learning algorithm (MLA), the system hosting a second MLA, the system being connected to a database, the system being connected to an electronic device via a communication network, the second MLA having been trained to determine query similarity based on textual content thereof, the system comprising:
a processor;
a non-transitory computer-readable medium comprising instructions;
the processor, upon executing the instructions, being configured to:
during a training phase:
acquire, by the server from a second database connected to the server, a set of training objects, the set of training objects having been previously generated by the server, a given training object of the set of training objects including:
a first past query and a second past query, the first past query and the second past query having been selected based a respective similarity parameter between the first past query and the second past query, the respective similarity parameter having been calculated based on:
(i) the degree of similarity between past documents presented in response to the first past query and past documents presented in response to the second past query;
(ii) the degree of similarity between past user interactions with past documents presented in response to the first past query and past user interactions with past documents presented in response to the second past query;
train the second MLA on the set of training objects to determine:
a similarity parameter between a query vector of a new query and the respective query vector of the given past query of the plurality of past queries, the new query not having been previously submitted to the server;
during an in-use phase:
receive from the electronic device, an indication of the current query, the current query not having been previously submitted to the system;
generate a set of search results, the set of search results containing a set of current documents relevant to the current search query;
retrieve by the second MLA from the database, a plurality of past queries, each past query of the plurality of past queries having been previously submitted to the system;
compute, by the second MLA, a respective similarity parameter between the current query and a respective one of the plurality of past queries, the respective similarity parameter being indicative of a degree of similarity between the current query and the respective one of the plurality of past queries, the computing for a given one of the plurality of past queries being based on:
at least one textual feature of the current query, and
at least one textual feature of the given one of the plurality of past queries;
select a subset of the plurality of the past queries based on the respective similarity parameter being above a pre-determined similarity threshold,
rank the set of current documents to obtain a ranked set of documents, the ranking being done by the first MLA, the first MLA taking into account the subset of the plurality of past queries as a ranking feature; and
transmit a search engine results page (SERP) for display on the electronic device, the SERP including the ranked set of documents.

18. The system of claim 17, wherein the processor is further configured to, prior to the retrieving the plurality of past queries:
generate a current query vector associated with the current query based on the at least one textual feature of the current query;
wherein the processor is further configured to, prior to the computing the respective similarity parameter:
acquire by the second MLA from the database, a respective query vector associated with the given one of the plurality of past queries, the respective query vector having been generated based on at least one respective textual feature of the given one of the plurality of past queries; and
the computing the respective similarity parameter is based on the current query vector and the respective query vector.

19. The system of claim 18, wherein the retrieving the plurality of past queries is based on the current query vector.

20. The system of claim 17, wherein the similarity parameter being above a predetermined threshold is used as a positive label for the training.

21. The system of claim 17, wherein to rank the set of current documents to obtain the ranked set of documents, the processor is configured to: take into account, by the first MLA, the respective similarity parameter between the at least one past query and the current query as a weight of the ranking feature.

22. The system of claim 17, wherein:
the training the second MLA comprises using a K-Nearest Neighbor Search (K-NNS) type algorithm; and
the processor is further configured to, after the training the second MLA:
generate, in the database, for each past query for the plurality of past queries:
the respective query vector associated with the given past query, and an indication of the given past query; and
store the respective query vector in the database.

23. The system of claim 22, wherein the K-NSS type algorithm is a Hierarchical Navigable Small World (HNSW) algorithm.

24. A system for ranking search results in response to a current query using a first machine learning algorithm (MLA), the system being connected to a database, the system being connected to an electronic device via a communication network, the system comprising:
- a processor;
- a non-transitory computer-readable medium comprising instructions;
- the processor, upon executing the instructions, being configured to:
- receive, from the electronic device, an indication of the current query;
- generate a set of search results, the set of search results containing a set of current documents relevant to the current search query;
- determine a presence of past user interactions with current documents in the set of current documents, the past user interactions with the current documents having been performed in response to a past query;
- in response to the presence of past user interactions:
- retrieve, from the database, a set of a plurality of past queries, each given past query of the plurality of past queries being associated with a respective set of past documents,
  - the respective set of past documents having been presented as search results in response to the given past query of at least some others of the plurality of past queries,
  - each past document of the respective set of past documents being associated with past user interactions with the respective past document presented in response to the given past query;
- generate a current query vector associated with the current query based on: current documents in the set of current documents and the past user interactions associated with the current documents in the set of current documents;
- generate a respective query vector associated with each of the plurality of past queries, the generating being based on: the past documents and the past user interactions with the past documents in the respective set of past documents;
- select the plurality of past queries based on the similarity of the current vector and the respective query vector;
- in response to no presence of past user interactions:
  - generate the current query vector associated with the current query based on at least one textual feature of the current query;
  - generate a respective query vector associated with each given past query of the plurality of past queries, the generating being based on: at least one textual feature of the given past query;
  - select the plurality of past queries based on the similarity of the current query vector and the respective query vector;
- rank the set of current documents to obtain a ranked set of documents, the ranking being done by the first MLA, the first MLA taking into account at least one past query of the set of the plurality of past queries; and
- transmit a search engine results page (SERP) for display on the electronic device, the SERP including the ranked set of documents.

* * * * *